US011125477B2

(12) United States Patent
Rule et al.

(10) Patent No.: US 11,125,477 B2
(45) Date of Patent: Sep. 21, 2021

(54) DRUM-TYPE MAGNETIC REFRIGERATION APPARATUS WITH IMPROVED MAGNETIC-FIELD SOURCE

(71) Applicant: Astronautics Corporation of America, Milwaukee, WI (US)

(72) Inventors: Kyle Charles Rule, Milwaukee, WI (US); Jeremy Jonathan Chell, Madison, WI (US); Andre Michael Boeder, Monona, WI (US); Bryant Wayne Mueller, Madison, WI (US); Steven Lee Russek, Glendale, WI (US); Carl Bruno Zimm, Madison, WI (US); Markus Schwind, Milwaukee, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 87 days.

(21) Appl. No.: 15/686,862

(22) Filed: Aug. 25, 2017

(65) Prior Publication Data
US 2019/0063795 A1    Feb. 28, 2019

(51) Int. Cl.
    *F25B 21/00* (2006.01)
(52) U.S. Cl.
    CPC ...... *F25B 21/00* (2013.01); *F25B 2321/0021* (2013.01); *F25B 2321/0022* (2013.01)
(58) Field of Classification Search
    CPC ............ F25B 21/00; F25B 2321/002; F25B 2321/0021; F25B 2321/0022;
    (Continued)

(56) References Cited

U.S. PATENT DOCUMENTS 4,332,135 A    6/1982  Barclay et al.
4,625,519 A *  12/1986 Hakuraku ............... F25B 21/00
                                                          62/3.1
(Continued)

FOREIGN PATENT DOCUMENTS

DE    10 2006 011 013    9/2007
EP       2 420 760 A1    2/2012
(Continued)

OTHER PUBLICATIONS

Apex Magnets. (Apr. 26, 2015). Retrieved Apr. 11, 2019, from https://www.apexmagnets.com/news-how-tos/the-various-shapes-of-magnets-and-their-uses/ (Year: 2015).*
(Continued)

*Primary Examiner* — Jianying C Atkisson
*Assistant Examiner* — Miguel A Diaz
(74) *Attorney, Agent, or Firm* — Foley & Lardner LLP

(57) ABSTRACT

A magnetic refrigeration apparatus includes one or more beds of magnetocaloric material arranged along a circumferential direction. The apparatus also includes a heat transfer fluid, one or more hot side heat exchangers (HHEX), one or more pumps or fluid displacement devices configured to move the heat transfer fluid, and a magnetic-field source. The magnetic-field source generates magnetic flux oriented substantially in a radial direction through the beds. The field source advantageously includes one or more pole pieces, one or more axial-end magnets, and one or more axial-end flux return pieces. Additionally, one or more circumferential flux returns, one or more gap flux return pieces, one or more side magnets, and one or more side flux return pieces can be added to increase system performance and reduce cost.

21 Claims, 18 Drawing Sheets

(58) Field of Classification Search
CPC .. F25B 2321/0023; H01F 1/012; H01F 1/015; Y02B 30/66
See application file for complete search history.

(56) References Cited

U.S. PATENT DOCUMENTS

| | | | |
|---|---|---|---|
| 4,702,090 A | 10/1987 | Barclay et al. | |
| 5,028,902 A | 7/1991 | Leupold et al. | |
| 5,249,424 A | 10/1993 | DeGregoria et al. | |
| 5,934,078 A | 8/1999 | Lawton et al. | |
| 6,526,759 B2 | 3/2003 | Zimm et al. | |
| 6,668,560 B2 | 12/2003 | Zimm et al. | |
| 6,935,121 B2 | 8/2005 | Fang et al. | |
| 6,946,941 B2* | 9/2005 | Chell | H01F 7/0205 335/296 |
| 7,148,777 B2 | 12/2006 | Chell et al. | |
| 7,481,064 B2 | 1/2009 | Kitanovski et al. | |
| 7,552,592 B2* | 6/2009 | Iwasaki | F25B 21/00 62/3.1 |
| 7,650,756 B2 | 1/2010 | Muller et al. | |
| 8,037,692 B2 | 10/2011 | Muller et al. | |
| 9,027,339 B2* | 5/2015 | Morimoto | F03G 7/00 60/527 |
| 9,631,843 B2* | 4/2017 | Benedict | F25B 21/00 |
| 9,702,594 B2* | 7/2017 | Vetrovec | F25B 21/00 |
| 9,995,512 B2* | 6/2018 | Morimoto | F25B 21/00 |
| 10,030,895 B2* | 7/2018 | Kim | F25B 21/00 |
| 10,436,481 B2* | 10/2019 | Vetrovec | F25B 21/00 |
| 10,684,044 B2* | 6/2020 | Schroeder | F25B 21/00 |
| 10,782,051 B2* | 9/2020 | Schroeder | F25B 21/00 |
| 10,830,506 B2* | 11/2020 | Schroeder | H01F 1/012 |
| 2002/0053209 A1 | 5/2002 | Zimm et al. | |
| 2005/0046533 A1* | 3/2005 | Chell | H01F 7/0205 335/306 |
| 2005/0242912 A1* | 11/2005 | Chell | F25B 21/00 335/306 |
| 2009/0019859 A1 | 1/2009 | Shin et al. | |
| 2009/0091411 A1* | 4/2009 | Zhang | H01F 7/0273 335/306 |
| 2009/0308079 A1 | 12/2009 | Lee | |
| 2010/0000228 A1 | 1/2010 | Wiest et al. | |
| 2010/0071383 A1 | 3/2010 | Zhang et al. | |
| 2010/0146989 A1 | 6/2010 | Egolf et al. | |
| 2010/0236258 A1* | 9/2010 | Heitzler | F25B 21/00 62/3.1 |
| 2011/0041514 A1* | 2/2011 | Heitzler | F25B 21/00 62/3.1 |
| 2011/0061398 A1* | 3/2011 | Shih | F25B 21/00 62/3.1 |
| 2011/0146300 A1 | 6/2011 | Duval | |
| 2011/0192833 A1* | 8/2011 | Muller | F25B 21/00 219/618 |
| 2011/0215088 A1 | 9/2011 | Muller et al. | |
| 2012/0074130 A1* | 3/2012 | Muller | H01F 7/0273 219/520 |
| 2012/0139676 A1* | 6/2012 | Sari | G01R 33/383 335/219 |
| 2012/0266591 A1* | 10/2012 | Morimoto | F03G 7/00 60/527 |
| 2012/0266607 A1* | 10/2012 | Morimoto | B60H 1/00899 62/3.1 |
| 2012/0272666 A1* | 11/2012 | Watanabe | F25B 21/00 62/3.1 |
| 2012/0285179 A1* | 11/2012 | Morimoto | F25B 41/20 62/3.1 |
| 2013/0104568 A1 | 5/2013 | Kuo et al. | |
| 2013/0186107 A1 | 7/2013 | Shih et al. | |
| 2013/0298571 A1* | 11/2013 | Morimoto | B60H 1/32 62/3.1 |
| 2014/0165595 A1* | 6/2014 | Zimm | F25B 21/00 62/3.1 |
| 2014/0311165 A1* | 10/2014 | Watanabe | F25B 21/00 62/3.1 |
| 2015/0168030 A1* | 6/2015 | Leonard | F25B 21/00 62/3.1 |
| 2015/0184902 A1 | 7/2015 | Torii et al. | |
| 2015/0184903 A1* | 7/2015 | Mun | F25B 21/00 62/3.1 |
| 2015/0206638 A1* | 7/2015 | Muller | H01F 7/0273 62/3.1 |
| 2015/0267943 A1* | 9/2015 | Kim | F25B 21/00 62/3.1 |
| 2016/0025385 A1* | 1/2016 | Auringer | F25B 21/00 62/3.1 |
| 2016/0076797 A1 | 3/2016 | Boeder et al. | |
| 2016/0091227 A1* | 3/2016 | Leonard | F25B 21/00 62/3.1 |
| 2016/0238287 A1* | 8/2016 | Benedict | F25B 21/00 |
| 2016/0298880 A1* | 10/2016 | Humburg | F25B 21/00 |
| 2016/0298881 A1* | 10/2016 | Humburg | B60H 1/00007 |
| 2016/0370037 A1* | 12/2016 | Morimoto | B60H 1/32 |
| 2017/0059214 A1* | 3/2017 | Shirron | F25B 21/00 |
| 2017/0059215 A1* | 3/2017 | Watanabe | F25B 21/00 |
| 2017/0067670 A1* | 3/2017 | Kummlee | F25B 21/00 |
| 2017/0120419 A1* | 5/2017 | Li | B24B 55/02 |
| 2017/0130999 A1* | 5/2017 | Numazawa | F25B 21/00 |
| 2017/0328609 A1* | 11/2017 | Benedict | A47L 15/4285 |
| 2017/0336108 A1* | 11/2017 | Muller | F25B 21/00 |
| 2017/0363333 A1* | 12/2017 | Vetrovec | F25B 21/00 |
| 2018/0023851 A1* | 1/2018 | Benedict | F25B 21/00 62/3.1 |
| 2018/0045437 A1* | 2/2018 | Vetrovec | F25B 21/00 |
| 2018/0156502 A1* | 6/2018 | Benedict | F25B 21/00 |
| 2018/0156503 A1* | 6/2018 | Benedict | F25B 21/00 |
| 2019/0063794 A1* | 2/2019 | Shirron | F25B 21/00 |
| 2019/0063795 A1* | 2/2019 | Rule | F25B 21/00 |
| 2019/0063796 A1* | 2/2019 | Rule | F25B 21/00 |
| 2019/0170408 A1* | 6/2019 | Iwaya | H01F 1/015 |
| 2019/0323744 A1* | 10/2019 | Schroeder | F25D 11/02 |

FOREIGN PATENT DOCUMENTS

| | | | |
|---|---|---|---|
| JP | 2002-106999 | | 4/2002 |
| JP | 2008051410 A | * | 3/2008 |
| JP | 2008051412 A | * | 3/2008 |
| JP | 2009-543022 A | | 12/2009 |
| WO | WO-03/016794 | | 2/2003 |
| WO | WO-03016794 A1 | * | 2/2003 ............. F25B 21/00 |
| WO | WO-2008/007834 A1 | | 1/2008 |

OTHER PUBLICATIONS

Engelbrecht, et al., "Recent Developments in Room Temperature Active Magnetic Regenerative Refrigeration," HVAC&R Research, Feb. 23, 2007, vol. 13, Issue 4, pp. 525-542.

Gschneidner, et al., "Thirty years of near room temperature magnetic cooling: Where we are today and future prospects," International Journal of Refrigeration, Sep. 2008, vol. 31, Issue 6, pp. 945-961.

Barcza, et al., "Stability and magnetocaloric properties of sintered La(Fe,Mn,Si) 13H2 alloys," presented at the IEEE International Magnetics Conference (Taipei, Taiwan) 2011, session ED-07.

Dung, et al., "Mixed Magnetism for Refrigeration and Energy Conversion," Advanced Energy Materials 1, 1215, (2011), 6 pages.

Engelbrecht, et al., "Recent Developments in Room Temperature Active Magnetic Regenerative Refrigeration," HVAC&R Research, 13 (2007) pp. 525-542.

Engelbrecht, et al., "Recent developments in room temperature active magnetic regenerative refrigeration," HVAC and R Research 13(4), pp. 525-542 (2007).

Extended European Search Report in EP 13864149, dated May 22, 2017 (10 pages).

Frischmann, et al., "Measuring Nusselt number using a single-blow regenerator facility", Proc. 3rd Int. Conf. on Mag. Refrig. at Room Temp., pp. 443-448 (2009).

Gschneider et al., "Thirty years of near room temperature magnetic cooling: Where we are today and future prospects," Int. J. of Refrig. 31: 945-961, 2008.

(56) References Cited

OTHER PUBLICATIONS

International Preliminary Report on Patentability in International Application No. PCT/US2013/075009 dated Jul. 2, 2015(8 pages).
International Search Report and Written Opinion in International Application No. PCT/US2013/075009 dated Aug. 26, 2014 (13 pages).
International Search Report and Written Opinion in International Application No. PCT/US2014/070106 dated Mar. 10, 2015 (10 pages).
International Search Report and Written Opinion in PCT/IB2018/056361 dated Nov. 20, 2018 (16 pages).
International Search Report and Written Opinion in PCT/IB2018/056402 dated Dec. 17, 2018 (14 pages).
Jacobs, "Modeling and optimal design of a multilayer active magnetic refrigeration system," Proc. 3rd Int. Conf on Mag. Refrig. at Room Temp., pp. 267-273 (2009).
Jacobs, et al., "Modeling of a magnetic refrigeration system with a layered bed," Proceedings of the 2010 International Symposium on Next-generation Air Conditioning and Refrigeration Technology (Japan): p. 09-1-p. 09-9, 2010.
Jacobs, et al., "The Performance of a Large-Scale Rotary Magnetic Refrigerator," Proceedings of the 5th International Conference on Magnetic Refrigeration at Room Temperature, Sep. 2012; published in the International Journal of Refrigeration, 37 (2014), pp. 84-91.
Jasinski, et al., "La(Fe,Co,Si)13 bulk alloys and ribbons with high temperature magnetocaloric effect" Journal of Applied Physics, v107, n9, p. 09A953 (3 pp.), 2010.
Non-Final Rejection Office Action on U.S. Appl. No. 14/105,843 dated Aug. 12, 2016 (12 pages).
Non-rinai Rejection Office Action on U.S. Appl. No. 14/105,843 dated Jan. 21, 2016 (12 pages).
Notice of Preliminary Rejection in KR 10-2017-7005425 dated Oct. 30, 2017, with English translation (11 pages).
Office Action in JP Appl. 2015-547987 dated Jan. 4, 2016, with English translation (10 pages).
Office Action in JP2017-504347 dated Aug. 23, 2017, with English translation (10 pages).
Russek, at al., "The performance of a rotary magnet magnetic refrigerator with layered beds," Proc. 4th Conference on Magnetic Refrigeration at Room Temperature, Baotou, China, Aug. 23-28, 2010, pp. 339-349.
Russek, et al., "Potential for cost effective magnetocaloric air conditioning systems," Int. J. of Refrig. 29(8), pp. 1366-1373 (2006).
Russek, et al., "Potential for cost effective magnetocaloric air conditioning systems," International Journal of Refrigeration, vol. 29, Issue 8, Dec. 2006, pp. 1366-1373.
Schmidt, F.W., et al., "Thermal Energy Storage and Reneration," McGraw-Hill Inc. (1981).
Supplementary Partial European Search Report dated Jan. 19, 2017 for EP Appl. 13864149 (7 pages).
Tagliafico, et al., "Dynamic 1D Model of an Active Magnetic Regenerator: A Parametric Investigation," Strojniski vestnik—Journal of Mechanical Engineering 58(2012) 1, pp. 9-15.
Zimm, et al., "Description and Performance of a Near-Room Temperature Magnetic Refrigerator", Advances in Cryogenic Engineering, 43, pp. 1759-1766 (1998).
Zimm, et al., "Design and initial performance of a magnetic refrigerator with a rotating permanent magnet," Proceedings of the 2nd International Conference on Magnetic Refrigeration at Room Temperature: pp. 341-347 (2007).
Zimm, et al., "Design and Performance of a Permanent Magnet Rotary Refrigerator," International Journal of Refrigeration, vol. 29, pp. 1302-1306 (2006).
Zimm, et al., "Design and performance of a permanent-magnet rotary refrigerator," Int. J. of Refrig. 29(8), pp. 1302-1306 (2006).
Zimm, et al., "Near room temperature magnetic refrigeration: the path to applications," Proc. 3rd Int. Conf. on Mag. Refrig. at Room Temp., pp. 355-361 (2009).

\* cited by examiner

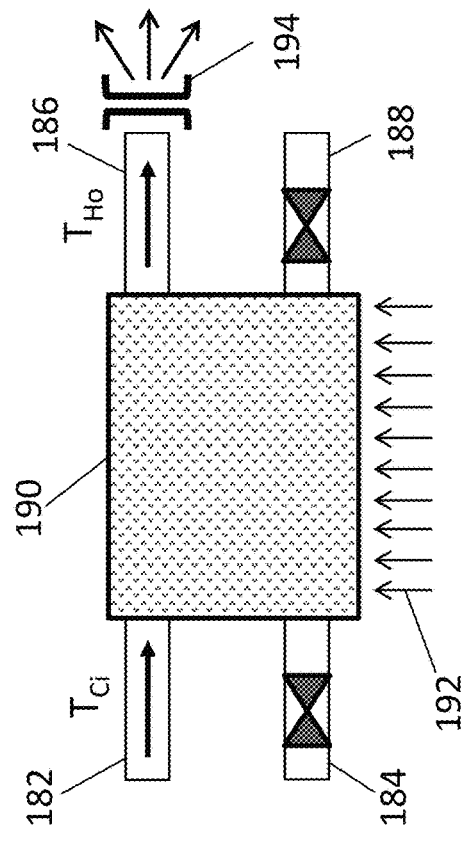
FIG. 1A: Magnetization
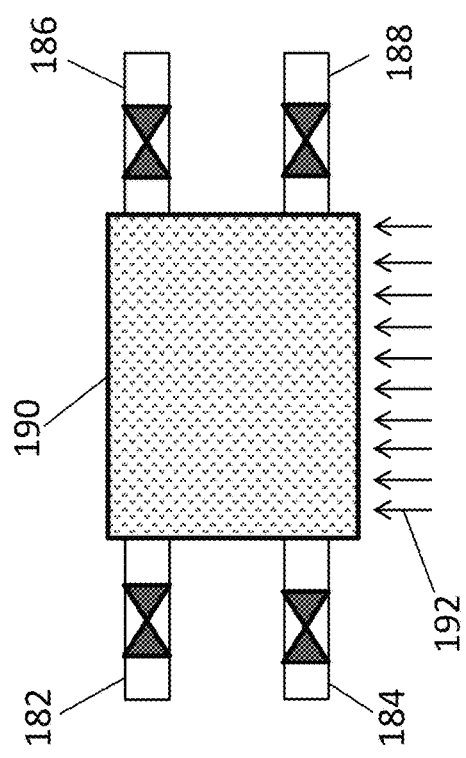
FIG. 1B: Cold to hot flow
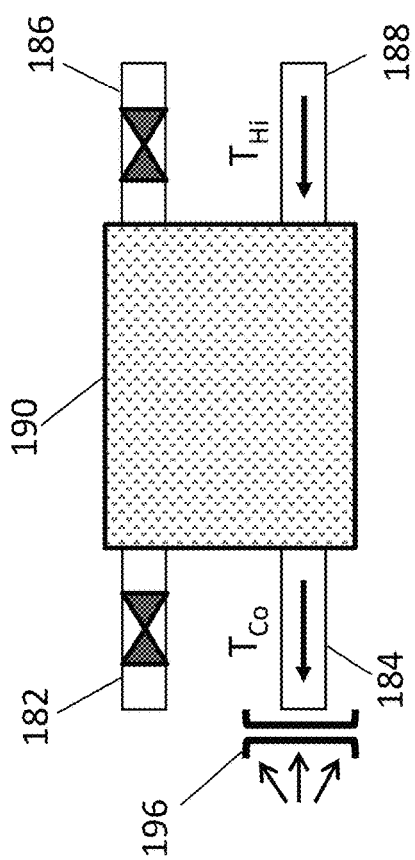
FIG. 1C: Demagnetization
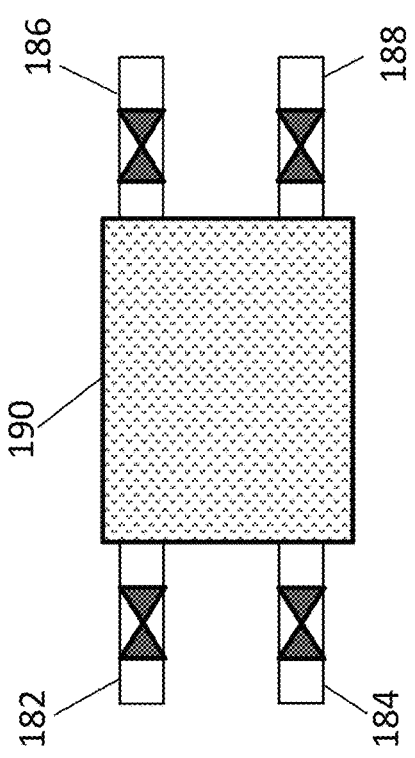
FIG. 1D: Hot to cold flow

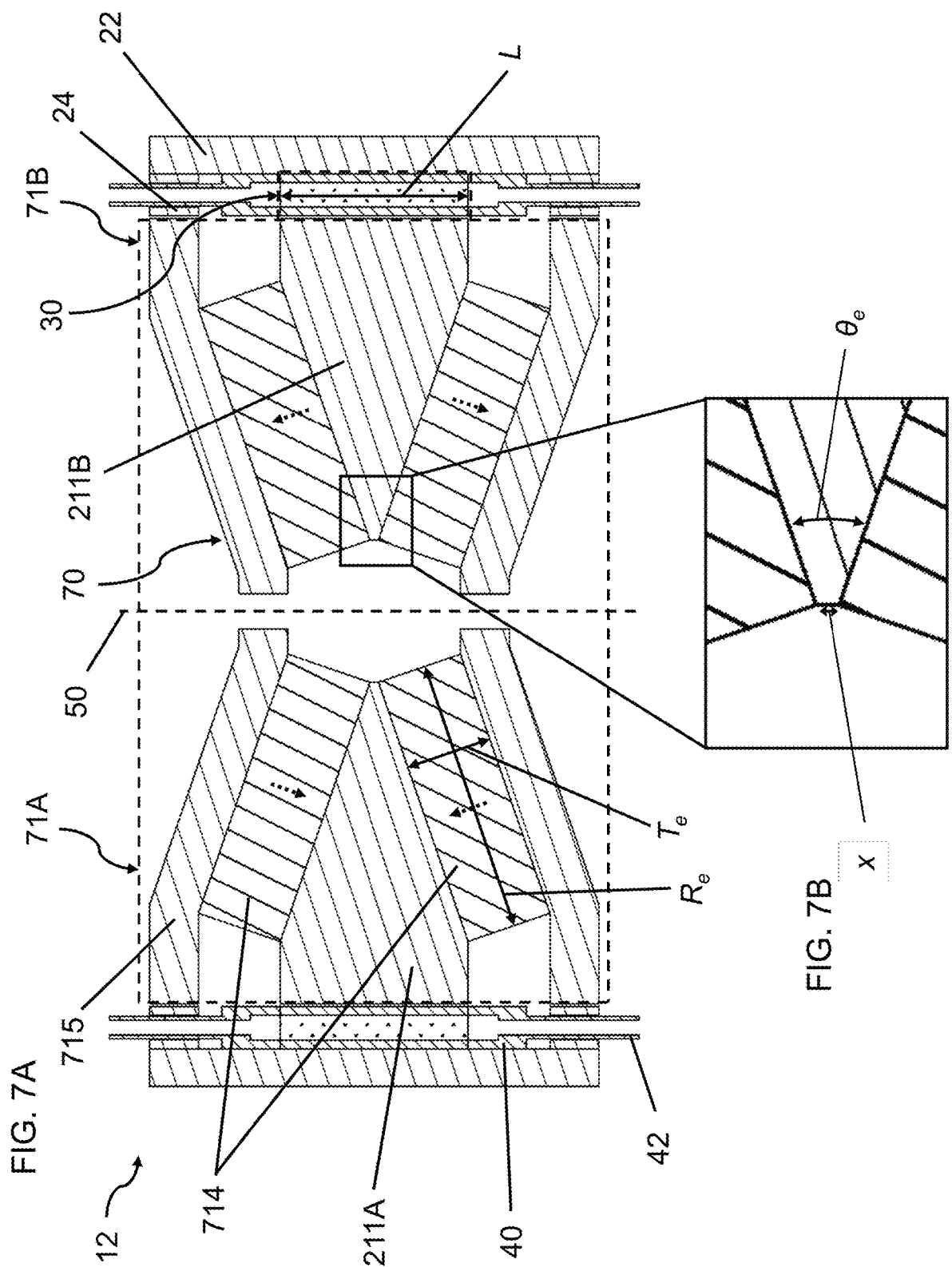

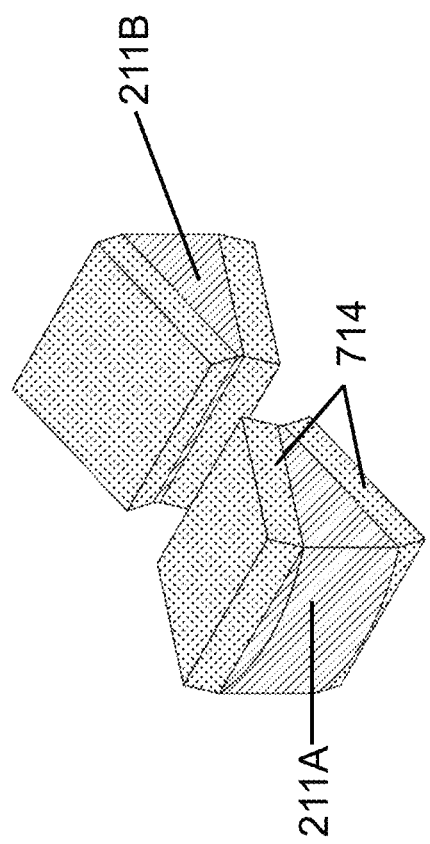

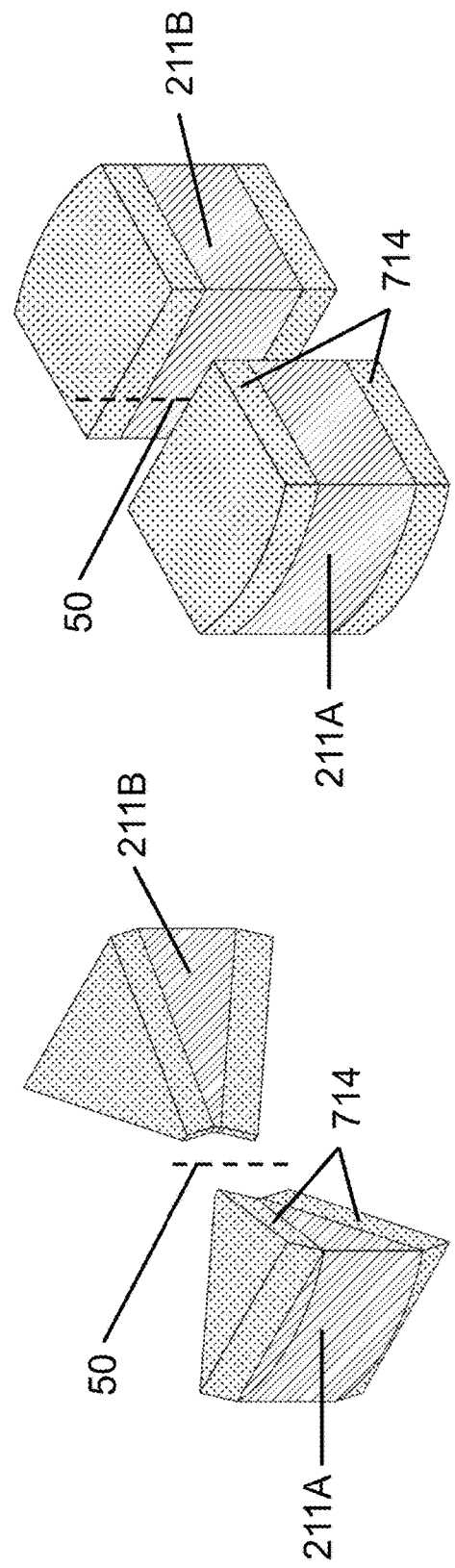
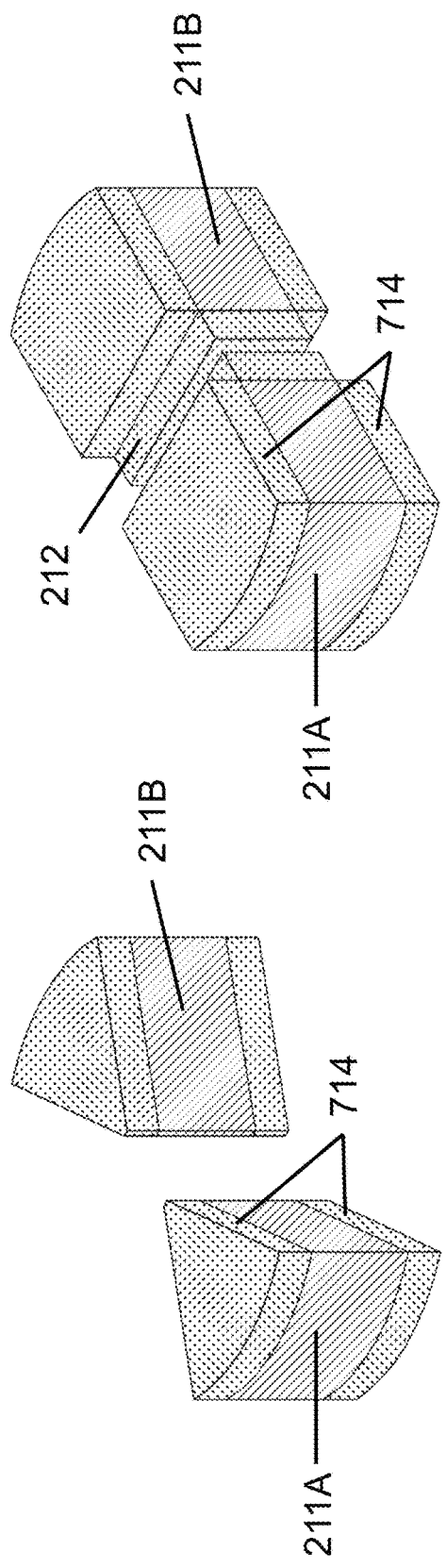
FIG. 8A
FIG. 8B
FIG. 8C
FIG. 8D

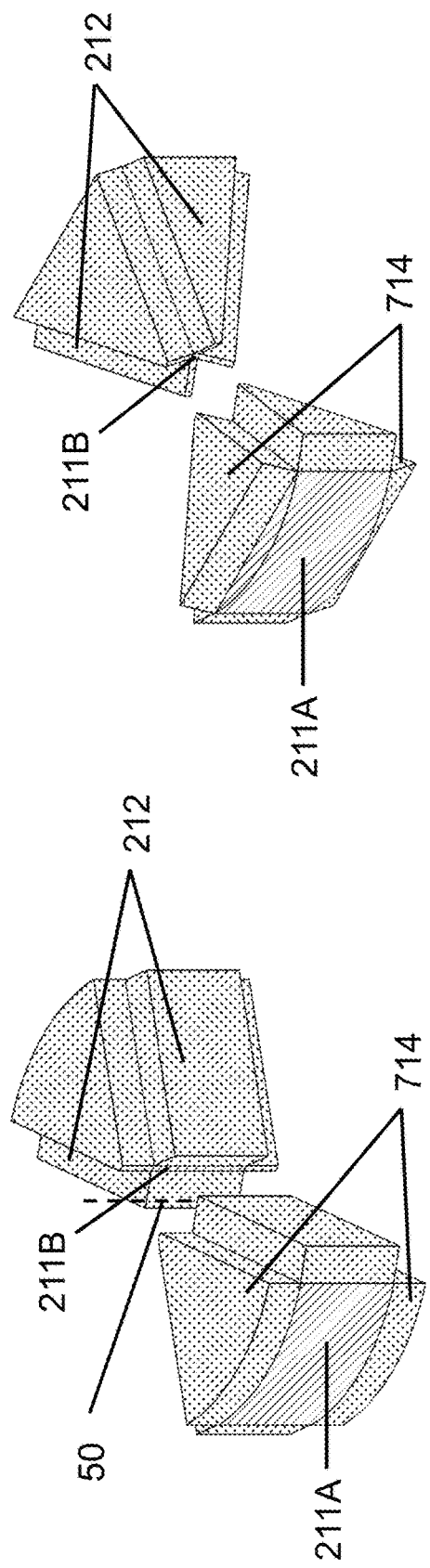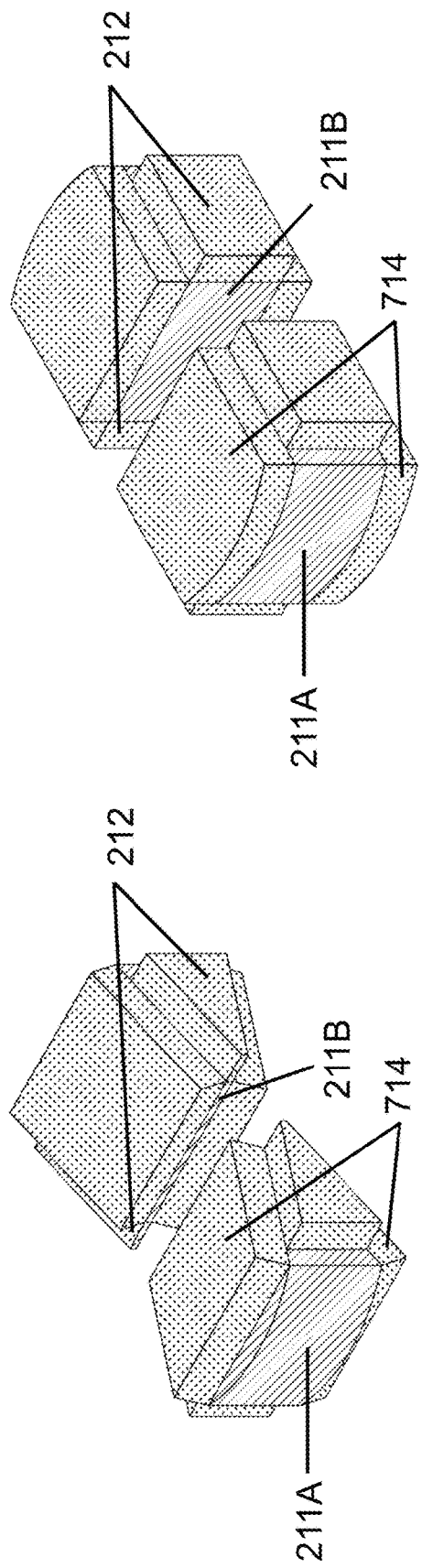
FIG. 12A  FIG. 12B  FIG. 12C  FIG. 12D

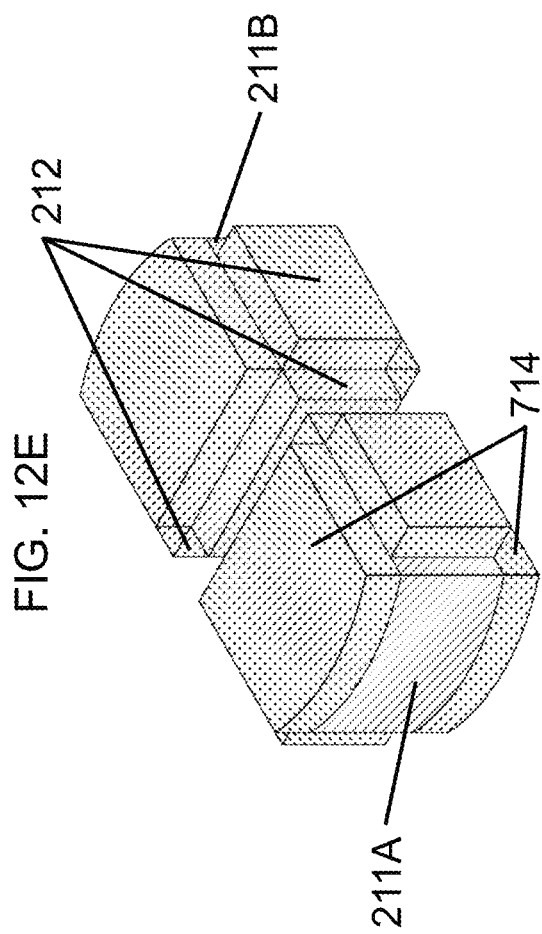

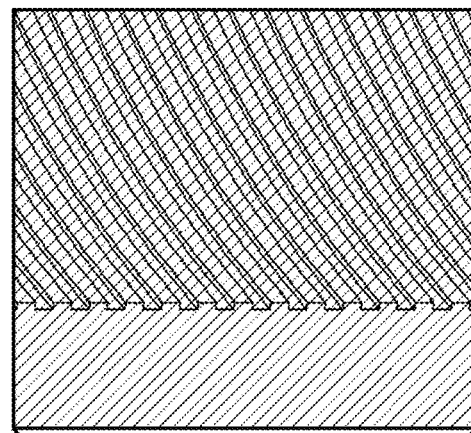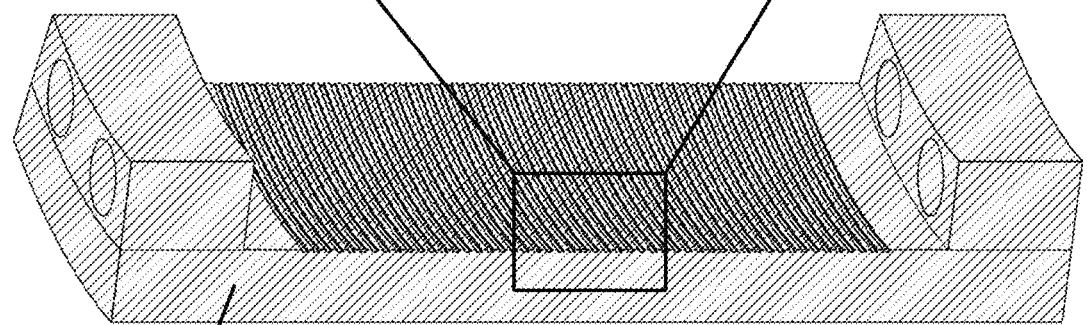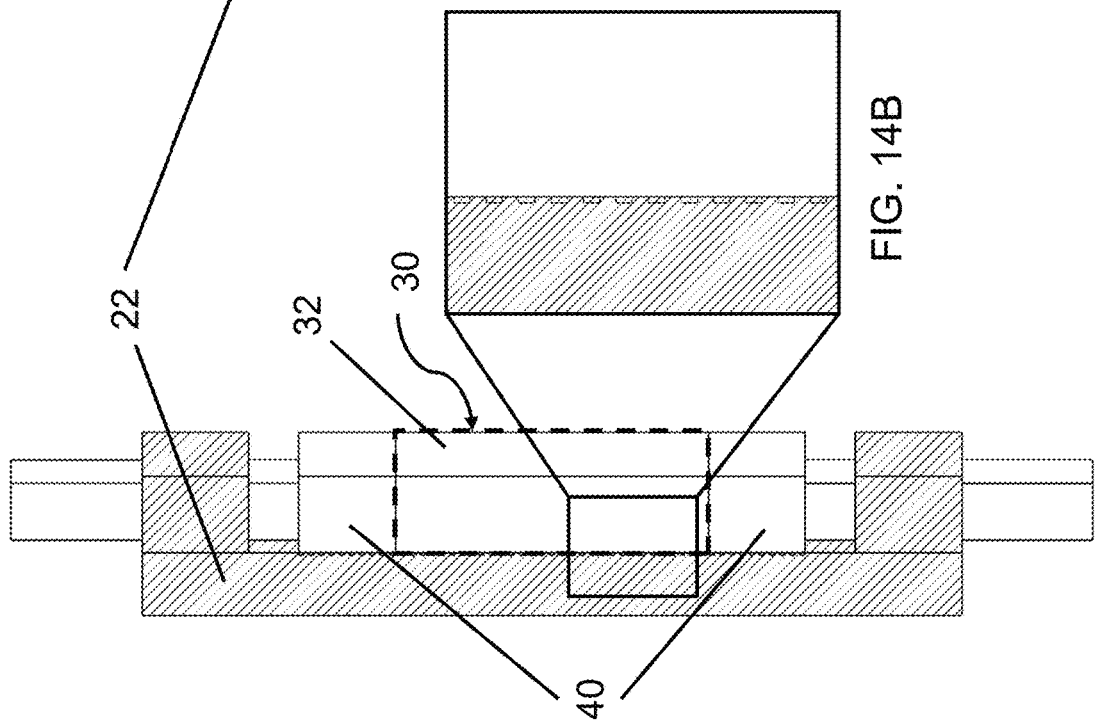

DRUM-TYPE MAGNETIC REFRIGERATION APPARATUS WITH IMPROVED MAGNETIC-FIELD SOURCE

BACKGROUND

Magnetic refrigeration (MR) is an emerging cooling technology that is based on the magnetocaloric effect: a property exhibited by certain materials which heat up when placed in a magnetic field and cool down when the field is removed. Magnetic refrigeration offers a number of distinct advantages over vapor compression, which is currently the most widely used method for cooling. First, MR uses no hydrofluorocarbons (HFCs), chlorofluorocarbons (CFCs), nor any other gaseous materials; the refrigerant in the MR system is in the form of a porous solid. The absence of any gases greatly reduces the potential for leaks, which is a common problem in vapor compression systems. As a result, MR systems can have greater reliability with reduced maintenance and downtime. The elimination of HFCs and CFCs has benefits for the environment, as these gases are ozone-depleting and contribute to global warming. Also, theoretical studies demonstrate that MR systems can be more energy-efficient than vapor compression systems. Many areas of opportunity exist to improve the performance of MR systems and reduce manufacturing costs.

SUMMARY

One aspect of the present disclosure is directed to MR apparatus and systems having a magnetic-field source comprised of magnets, pole pieces and flux returns that do not extend along the entire length of the magnetic-field source in a direction parallel to a central axis (i.e., the magnetic-field source has non-identical cross-sections normal to the central axis). Illustrative MR apparatus and systems of the present disclosure may further include at least two beds of MCM arranged along a circumferential direction, a heat transfer fluid, one or more HHEXs, and one or more pumps or fluid displacement devices configured to move the heat transfer fluid through the MR apparatus. The MR apparatus can also include one or more valves configured to control the flow of heat transfer fluid, fluid plena and flow tubes to direct the flow of heat transfer fluid between components, and/or one or more CHEXs which accept cold fluid from the demagnetized beds. The magnetic-field source in the MR apparatus generates magnetic flux with a magnetic field direction oriented substantially in a radial direction through the beds. The magnetic-field source is configured to apply a time-varying magnetic field to the beds via relative rotation of the magnetic-field source with respect to the beds about a central axis. The magnetic-field source further comprises one or more poles wherein each of the one or more poles comprises one or more pole pieces, one or more axial-end magnets, and one or more axial-end flux return pieces. Additionally, the magnetic-field source can further comprise one or more side magnets and one or more side flux return pieces. A subassembly of a pole piece together with its magnets is called a magnet pole piece subassembly or simply a MPS. The MR apparatus can further comprise one or more nominally circumferential flux returns, which guide the magnetic field from a pole of the magnetic-field source through the beds and then onto an opposing pole of the magnetic-field source to complete the magnetic circuit. The one or more circumferential flux returns and the other flux return components of the magnetic-field source are made from high permeability magnetic materials. The MR apparatus may also include one or more gap flux return pieces to provide a low magnetic reluctance pathway for the magnetic field to traverse from the magnetic-field source to the one or more circumferential flux returns at the axial ends of the MR apparatus.

A first embodiment of the MR apparatus utilizes a magnetic-field source comprised of poles with MPS having solely axial-end magnets and axial-end flux returns, referred to herein as the axial embodiment. A particularly useful feature of the axial embodiment is that the total magnet mass is less sensitive to the axial length of the bed. This lower sensitivity arises from the ability to readily vary the axial-face angle while maintaining the overall diameter of the MR apparatus fixed.

In a second embodiment, referred to herein as the full array embodiment, the MR apparatus utilizes a magnetic-field source comprised of poles with MPS having both axial-end magnets and axial-end flux return pieces as well as side magnets and side flux return pieces. This embodiment has improved mass efficiency compared to the axial embodiment for a similar set of performance requirements.

In a third embodiment, referred to herein as the contacting embodiment, the MR apparatus comprises a circumferential flux return located at a larger diameter than the beds. In this configuration, the circumferential flux return is referred to as an outer flux return (OFR). In the contacting embodiment, the beds can comprise a bed shell and a magnetocaloric material. The OFR is arranged to contact the bed shell to provide structural support, reducing the required radial thickness of the bed shell walls. In the contacting arrangement it is further contemplated that surface features can be added to the contacting faces of the bed shell or the OFR to reduce heat transfer losses.

BRIEF DESCRIPTION OF THE FIGURES

FIGS. 1A through 1D are schematics illustrating an AMR cycle to perform cooling, in accordance with an illustrative embodiment.

FIG. 7A is a side view of the MR apparatus shown in FIG. 5, at a cross-section through a symmetry plane parallel to the central axis, in accordance with an illustrative embodiment.

FIG. 7B is a detailed view of a portion of the pole piece near the inner radius of the MR apparatus shown in FIG. 5, in accordance with an illustrative embodiment.

FIG. 7C is an isometric view showing the arrangement of the MPS from the MR apparatus shown in FIG. 5, in accordance with an illustrative embodiment.

FIG. 8A is an isometric view of a magnet arrangement for an MPS including axial-end magnets (no side magnets), wherein the pole piece is tapered on its axial-end surfaces and side surfaces, in accordance with an illustrative embodiment.

FIG. 8B is an isometric view of a magnet arrangement for an MPS including axial-end magnets (no side magnets), wherein the pole piece is not tapered, in accordance with an illustrative embodiment.

FIG. 8C is an isometric view of a magnet arrangement for an MPS including axial-end magnets (no side magnets), wherein the pole piece is tapered in on its side surfaces, in accordance with an illustrative embodiment.

FIG. 8D is an isometric view of the magnet arrangement of FIG. 8B, wherein each MPS includes an additional side magnet at the inner radius of the pole piece, in accordance with an illustrative embodiment.

FIG. 12A is an isometric view illustrating an alternative magnet arrangement for a magnetic-field source including both axial-end magnets and side magnets, similar to the MR apparatus shown in FIG. 9, wherein the pole piece is tapered at its side surfaces.

FIG. 12B is an isometric view illustrating an alternative magnet arrangement for a MPS including both axial-end magnets and side magnets, wherein the pole piece is tapered at its axial-end surfaces and its side surfaces.

FIG. 12C is an isometric view illustrating an alternative magnet arrangement for a MPS including both axial-end magnets and side magnets, wherein the pole piece is tapered on its axial-end surfaces.

FIG. 12D is an isometric view illustrating an alternative magnet arrangement for a MPS including both axial-end magnets and side magnets, wherein the pole piece is not tapered.

FIG. 12E is an isometric view illustrating an alternative magnet arrangement for a MPS including both axial-end magnets and side magnets, wherein each pole further comprises an additional side magnet at the inner radius of the pole piece.

FIG. 14A is a side view of a single bed section of the circumferential flux return of the MR apparatus shown in FIG. 13.

FIG. 14B is a detailed view of FIG. 14A, showing surface features according to the current disclosure.

FIG. 14C is an isometric view showing a portion of the circumferential flux return.

FIG. 14D is a detailed view of FIG. 14C, showing surface features on the circumferential flux return according to the current disclosure.

DETAILED DESCRIPTION

Figure 2:
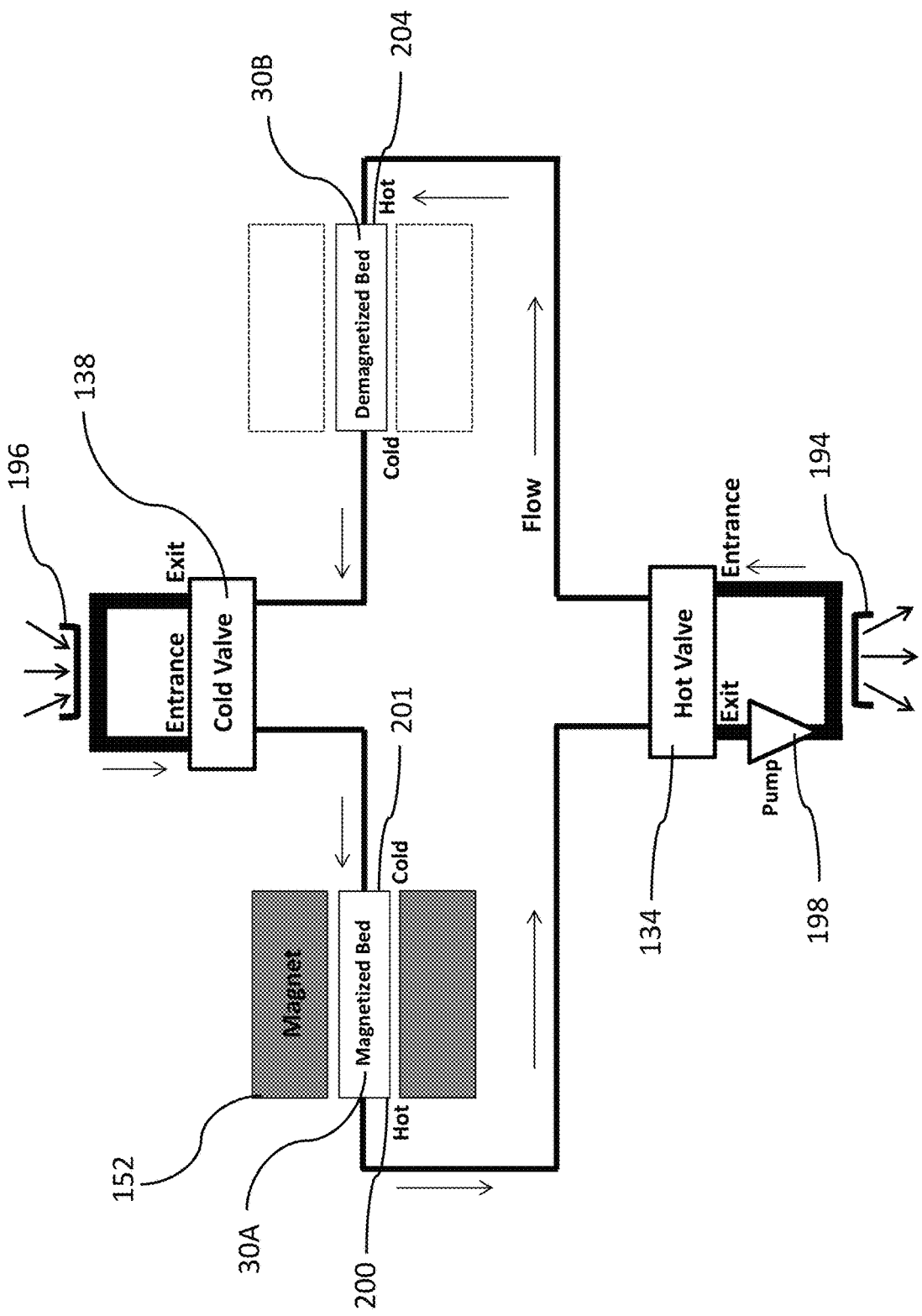
FIG. 2 is a flow schematic for an AMR cycle, in accordance with an illustrative embodiment.

General background on magnetic refrigeration may be found at K. Gschneidner and V. Pecharsky, "Thirty years of near room temperature magnetic cooling: Where we are today and future prospects," Int. J. of Refrig. 31: 945-961, 2008 and K. Engelbrecht, G. Nellis, S. Klein, and C. Zimm, "Recent Developments in Room Temperature Active Magnetic Regenerative Refrigeration," HVAC&R Research, 13(4): 525-542, 2007. These and all other referenced journal articles, patents, and applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Modern near room-temperature MR systems implement the so-called Active Magnetic Regenerator (AMR) cycle to perform cooling; an example of an MR apparatus that implements the so-called AMR cycle to perform cooling is discussed in U.S. Pat. No. 4,332,135. The cycle has four stages, as shown schematically in FIGS. 1A, 1B, 1C, and 1D. The MR system in these figures consists of a porous bed of magnetocaloric material (MCM), bed 190, and a heat transfer fluid which exchanges heat with the MCM as it flows through the bed 190. The left side of the bed 190 is the cold end, while the hot end is on the right side. The timing and direction (hot-to-cold or cold-to-hot) of the fluid flow is coordinated with the application and removal of the magnetic field 192. In the first stage of the cycle ("magnetization"), as shown in FIG. 1A, while the fluid in the bed 190 is stagnant, a magnetic field 192 is applied to the MCM causing the MCM to heat. In the next stage (the "hot blow"), as shown in FIG. 1B, while the magnetic field 192 over the bed 190 is maintained, fluid at a temperature TCi (the cold inlet temperature) is pumped through the bed from the cold end to the hot end through the cold inlet 182. This fluid pulls heat from the MCM in bed 190 and rises in temperature as it passes through the bed 190. During the hot blow, the fluid exits the bed 190 at the temperature THo (the hot outlet temperature) through the hot outlet 186 and is circulated through a hot-side heat exchanger (HHEX) 194, where the fluid gives up heat to the ambient environment and returns to the temperature THi (the hot inlet temperature), which is less than THo. In the next stage ("demagnetization"), as shown in FIG. 1C, the fluid flow is terminated and the magnetic field is removed. This causes the bed 190 to cool further. In the final stage (the "cold blow"), as shown in FIG. 1D, fluid at a temperature THi is pumped through the bed 190 from the hot end via the hot inlet 188 to the cold end in the continued absence of the magnetic field. The fluid is cooled as it passes through the bed 190, reaching a temperature TCo (the cold outlet temperature), which is less than TCi. At this point, the fluid is directed to a cold-side heat exchanger (CHEX) 196, which can adopt two types of functions as summarized herein and described in further detail, for example, in paragraphs [0125]-[0128] of published U.S. patent application Ser. No. 14/567,835, the entirety of which is incorporated herein by reference. The colder fluid exiting the bed 190 during the cold blow via the cold outlet 184 may be circulated through a CHEX 196 of a first type, transferring heat from a cold source (e.g., a refrigerated environment, or a secondary-fluid). The fluid then exits the CHEX 196 of the first type at temperature TCi and completes the AMR cycle. Alternately, a first part of the fluid may be circulated through a CHEX 196 of a second type, transferring heat from an external counter-flowing stream to be chilled, before returning to the hot end of the bed 190 via hot inlet 188 (FIG. 1D). A second part of the fluid, which has not circulated through the CHEX 196 of the second type, is returned to the cold end of the bed 190 via cold inlet 182 (FIG. 1B). Alternately, parts of the fluid may be directed to both types of CHEX. The heat absorbed by the cold fluid in the CHEX 196 of the first type during the cold blow allows the refrigerated environment to maintain its colder temperature, and the heat absorbed by the cold fluid in the CHEX 196 of the second type during the cold blow allows an external fluid stream to be chilled.

Although FIGS. 1A, 1B, 1C, and 1D illustrate an example of an operation of a single-bed MR system, one of ordinary skill in the art would see that multiple beds, each undergoing the same or similar AMR cycle, may be advantageously combined in a single system to increase the cooling power, reduce the system size, or otherwise improve the performance of the cycle. Illustrative examples of MR apparatuses include U.S. Pat. Nos. 6,526,759 and 6,668,560, both of which are incorporated herein by reference in their entirety. U.S. Pat. No. 6,526,759 describes, in part, an MR apparatus in which the beds rotate relative to a fixed magnetic-field source enabling the beds to be magnetized when entering a gap in the magnetic-field source and demagnetized when exiting the gap of the magnetic-field source. U.S. Pat. No. 6,668,560 describes, in part, an MR apparatus in which the magnetic-field source rotates relative to a fixed assembly of beds enabling the beds to be magnetized when entering the gap of the magnetic-field source and demagnetized when exiting the gap of the magnetic-field source.

FIG. 2 generally depicts a flow schematic for a multi-bed MR apparatus at a condition where the magnet is aligned with bed 30A, such that bed 30A is magnetized. In addition to the beds 30A and 30B, a typical MR apparatus includes a heat transfer fluid, one or more HHEXs 194, one or more pumps or fluid displacement devices 198 configured to move the fluid through the MR apparatus, and a magnetic-field source 152 for applying and removing a magnetic field to the beds 30A and 30B (corresponding to a high value or state of the magnetic field and a low value or state of the magnetic field, respectively). The MR apparatus can further comprise a device to control the flow, to coordinate the timing and direction of the fluid flow through the beds 30A and 30B with the application and removal of the magnetic field through the beds 30A and 30B. In FIG. 2, the flow of the fluid through the MR apparatus is controlled by two rotary valves, a cold valve 138 and a hot valve 134. For the condition where the magnet is aligned with bed 30B (not shown), the flow direction through the beds is reversed. The MR apparatus further comprises one or more CHEXs 196 which accepts cold fluid from the demagnetized beds 30B. The CHEX(s) 196 may be of two distinct types. A first type transfers heat from a cold source to the fluid and then returns the fluid to the cold end 201 of the magnetized beds 30A. The CHEX 196 shown in FIG. 2 is of the first type. A second type of CHEX (not shown) transfers heat from an external counter-flowing fluid to be chilled then returns the fluid to the hot end 204 of the demagnetized beds 30B. Either or both types of CHEXs 196 may be present within the MR apparatus. If both types are present, then devices are provided to control the flow between the types of CHEXs 196 (not shown). In alternative embodiments, any suitable type of CHEX may be used.

One implementation the MR apparatus comprises a cylindrical bed ring formed from separate, individual beds. In some instances, each bed is identical to the others. Alternatively, a single bed shell can be used that comprises multiple beds. The beds may be rotated relative to a fixed magnetic-field source enabling the beds to be magnetized when entering a gap of the magnetic-field source and demagnetized when exiting the gap of the magnetic-field source. Alternatively, the magnetic-field source may be rotated relative to a fixed assembly of beds, enabling the beds to be magnetized when entering the gap of the magnetic-field source and demagnetized when exiting the gap of the magnetic-field source. In this MR apparatus configuration, referred to herein as a drum-type MR apparatus, the magnetic-field source is configured to generate magnetic flux that passes in a substantially radial direction through the beds. Increasing the magnetic field (also known as the magnetic flux density) in the high field region of the gap improves the thermal performance of the MR apparatus. Ideally, the bed experiences no magnetic field while it is outside of the gap of the magnetic-field source. In summary, the MR apparatus can be configured such that either the beds remain stationary and the magnetic-field source rotates or the magnetic-field source remains stationary and the beds rotate.

Typically, a magnetic field of 0.75-1.5 Tesla is utilized to effectively exploit the magnetocaloric effect for commercially relevant refrigeration, although any other suitable field can be used. This field is usually provided by a magnetic-field source comprising an assembly of powerful NdFeB magnets along with flux return elements (such as soft iron) with high magnetic permeability that guides the magnetic flux in a desired pattern, although other magnets may be used. Together the magnets as well as the flux return elements form a complete magnetic circuit through which the magnetic flux is both generated and transmitted. The magnetic permeability and proximity of the flux return elements to the magnets limits the effectiveness of the magnetic circuit. A portion of the magnetic flux will inevitably bypass the magnetic circuit toward the periphery of the system, where the flux cannot be effectively utilized by the beds. This fringing or leakage flux, as it will be referred to herein, does not contribute beneficially to the performance of the MR apparatus. Because of their use of the rare-earth elements Nd and Dy, NdFeB magnets are costly, and the cost of a magnetic refrigeration system may be significantly impacted by the cost of the NdFeB magnets it uses. Consequently, to be commercially viable, a magnetic refrigeration system may use the minimum mass of NdFeB. As used herein, the term "mass efficiency" refers to the quantity of permanent magnet material needed to generate a desired magnetic flux density in a gap occupied by the beds.

Figure 3:
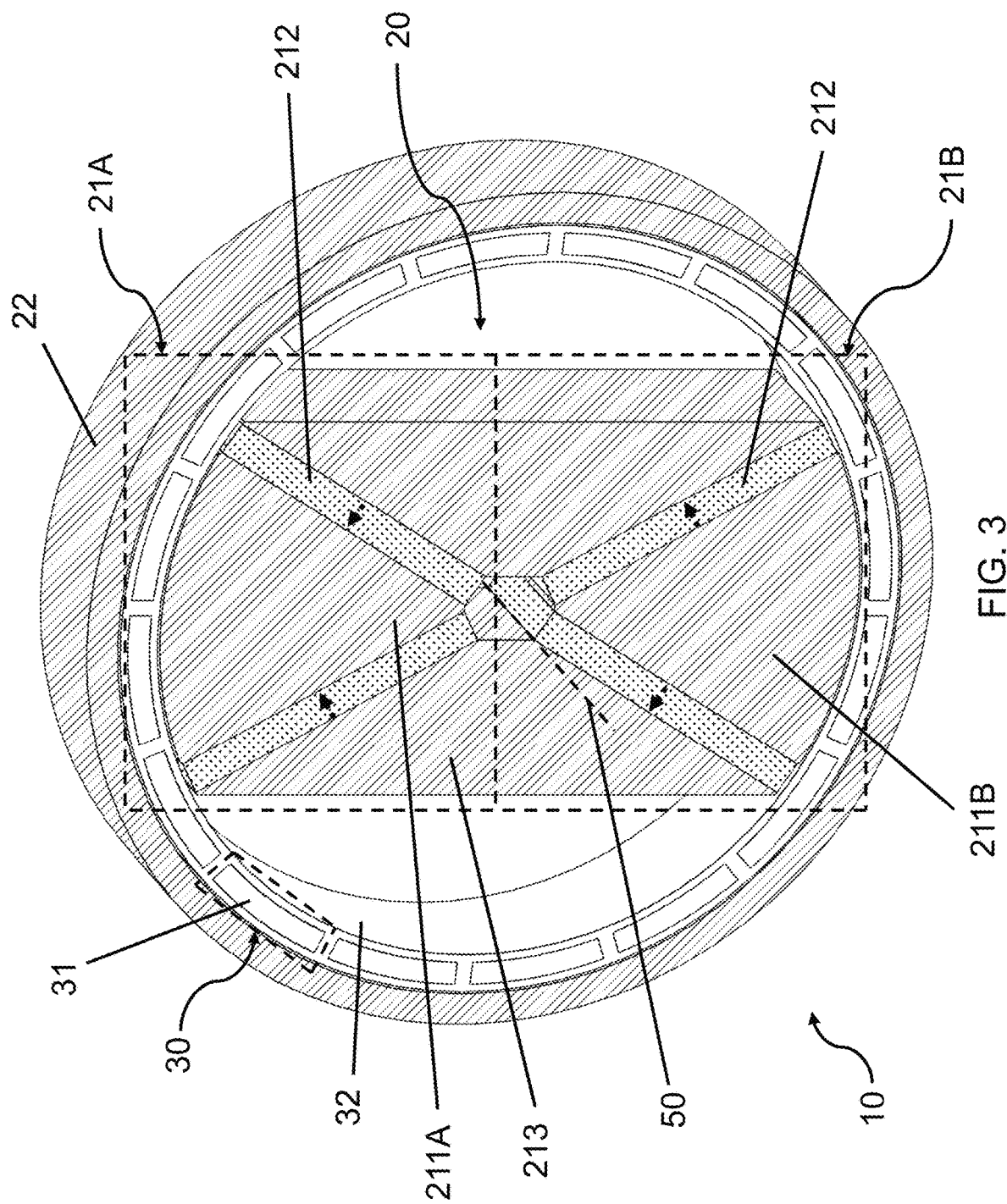
FIG. 3 is an isometric view of a drum-type MR apparatus.

For drum-type MR systems, with a field direction oriented substantially in the radial direction through the beds, an attractive option is to utilize magnetic-field source configurations with arrangements of magnets, pole pieces, and flux returns in the form of right prisms resulting in an overall magnetic-field source that is also a right prism. An example is shown in FIG. 3, which depicts a magnetic-field source configuration wherein all cross-sections normal to its central axis are identical. Since the cross-sections are identical it is convenient to describe this configuration as a two dimensional magnetic-field source (2D magnetic-field source). A 2D magnetic-field source can be analyzed using finite element analysis (FEA) techniques. By creative application of known physical principals, the dimensions and shapes of the axial end faces of the magnets can be varied using FEA techniques to obtain an optimal solution based on a given set of application requirements.

Typical MR apparatus configurations (wherein the magnetic flux is oriented substantially in a radial direction) have magnet assemblies comprised of magnets, pole pieces, and flux returns in the form of right prisms that extend along the entire length of the magnetic-field source in a direction parallel to the central axis. As such, the magnetic-field source of typical MR apparatus configurations are themselves right prisms that have identical (or similar) cross-sections normal to the central axis. In some embodiments, one or more auxiliary components of the magnetic-field source (e.g., components that do not participate in the generation or transmission of magnetic flux such as mounting components or shielding) may not extend along the length of the magnetic-field source.

FIG. 3 generally depicts a drum-type MR apparatus 10, referred to herein as the two-dimensional (2D) drum apparatus, which includes a typical magnetic-field source 20 configuration. The magnetic-field source 20 for the MR apparatus 10 shown in FIG. 3 comprises side magnets 212, pole pieces 211A and 211B, and side flux return pieces 213 in the shape of right prisms whose cross-sections normal to the central axis 50 are identical (or similar). In addition, the magnetic-field source 20 for the 2D drum apparatus is also a right prism whose cross-sections normal to the central axis 50 are identical (or similar). The 2D drum apparatus further comprises a plurality of magnetocaloric beds 30, a heat transfer fluid, one or more HHEXs (not pictured), and one or more pumps or fluid displacement devices (not pictured) configured to move the heat transfer fluid through the MR apparatus 10. The system further comprises one or more valves (not pictured) configured to control the flow of heat transfer fluid to the beds 30 and one or more CHEXs (not pictured) that accept cold fluid from the demagnetized beds 30.

The magnetic-field source 20 shown in FIG. 3 comprises two poles 21A and 21B, wherein each pole comprises a pole piece 211A, 211B, one or more side magnets 212, and one or more side flux return pieces 213. In the 2D drum apparatus, the pole pieces 211A and 211B are in the shape of right prisms whose base faces, at each axial end of the magnetic-field source 20, have a curved edge near the gap to provide uniform clearance between the pole pieces 211A and 211B and the beds 30. As shown in FIG. 3, the pole pieces 211A and 211B are tapered such that the distance between the side magnets 212 is greater at the outer radius of the pole pieces 211A and 211B than at the inner radius of the pole pieces 211A and 211B. The side magnets 212 for pole 21A are arranged in a circumferential direction to at least partly surround the pole piece 211A. The surfaces of the pole piece 211A in contact with the side magnets 212 are referred to herein as side surfaces. In the 2D drum apparatus, the side surfaces are parallel to the central axis 50. The side magnets 212 have a magnetization vector that is oriented toward the pole piece 211A and normal to the side surfaces, as shown by the dotted arrows in FIG. 3. The side magnets 212 for pole 21B are arranged similarly to 21A but instead have a magnetization vector that is oriented away from the pole piece 211B, as shown by the dotted arrows in FIG. 3. The side magnets 212 are in the shape of right prisms, with two-dimensional axial end or base faces whose cross-sections at any location normal to the central axis 50 are identical (or similar). There are many different two-dimensional geometries that can be used for the base faces of the side magnets 212. In the 2D drum apparatus shown in FIG. 3, the side magnets 212 are in the shape of rectangular prisms that are characterized by a uniform direction of the magnetization vector. The magnetization vector of the side magnets 212 is oriented perpendicular to the surface of the side magnet 212 in contact with the side surface of the pole piece 211A. This magnetization vector orientation shown by the dotted arrows in FIG. 3 allows for a more uniform energy product throughout the side magnets 212, which results in an increased mass efficiency of the permanent magnet material. As used herein, the energy product of a magnet refers to the stored energy within the magnetic material. Not considering leakage or field utilization by the MCM, a magnet achieves the highest mass efficiency when it is operating at the maximum energy product for the material. Using magnets in the shape of rectangular prisms also reduces manufacturing costs.

A two-pole magnetic-field source is used in the 2D drum apparatus shown in FIG. 3. The magnetic flux from pole 21A is directed by the pole piece 211A, which is made from a material with high magnetic permeability, generally referred to as a soft magnetic material; some examples of soft magnetic materials include low carbon steel or iron-cobalt-vanadium alloys, which have a magnetic permeability on the order of 1.26 e-4 H/m and 2.3 e-2 H/m, respectively. Other suitable materials with high magnetic permeability may also be used. The pole piece 211A guides the magnetic flux in a substantially radial direction through a gap (where the beds 30 are located) to a nominally circumferential flux return 22. The nominally circumferential flux return 22 is located at an axial position along the central axis 50 that is substantially aligned with an axial position of the beds 30. In other words, there exists a plane normal to the central axis 50 that passes through both the beds 30 and the circumferential flux return 22. In the 2D drum apparatus, the circumferential flux return 22 is positioned such that the axial ends of the circumferential flux return 22 are equidistant from the axial ends of the beds 30. As shown in FIG. 3, the circumferential flux return 22 for the 2D drum apparatus is located at a larger radius than the beds 30, and hence will be referred to simply as the outer flux return (OFR) 22. The circumferential flux return 22 can alternatively be located at a smaller radius than the beds 30, in which case the positions of the magnetic-field source 20 and the circumferential flux return 22 will be reversed (not shown). Alternatively, the MR apparatus 10 can function without a circumferential flux return 22 in which case a two-part magnetic-field source can be used, wherein a first part of the magnetic-field source exchanges magnetic flux with a second part of the magnetic-field source across the gap (not pictured). Returning to FIG. 3, like the pole piece 211A, the OFR 22 can also be made from a soft magnetic material and guides the flux in a circumferential direction from pole 21A to pole 21B of the magnetic-field source 20. After passing through the OFR 22, the magnetic flux passes substantially in a radial direction through a gap formed between the pole piece 211B and the OFR 22 and back through the pole piece 211B. As shown by the dotted arrows in FIG. 3, the magnetization vectors for the side magnets 212 in pole 21B are oriented away from the pole piece 211B, and direct the magnetic flux to the side flux return pieces 213, which guide the flux back to the side magnets 212 of pole 21A. The side flux return pieces 213 are placed adjacent to, and in contact with, the side magnets 212. The side flux return pieces 213 are made from a soft magnetic material and can take many forms. Like the side magnets 212, the side flux return pieces 213 are arranged in a circumferential direction in each pole 21A and 21B.

FIG. 3 generally depicts the beds 30 for the 2D drum apparatus, which include MCM 31 and a bed shell 32. The beds 30 are arranged in a circumferential direction relative to the central axis 50 and are coaxial with the magnetic-field source 20, such that the magnetic-field source 20 is substantially (or entirely) surrounded by the beds 30 in a plane that is normal to the central axis 50. The bed shell 32 is typically made from a material with low thermal conductivity to reduce heat transfer losses due to axial conduction; some examples include polycarbonate and polypropylene, whose thermal conductivity is on the order of 0.2 W/m-K. Other suitable materials with low thermal conductivity may also be used. In the embodiment shown in FIG. 3, each bed 30 has its own bed shell. However, other alternatives are contemplated. For example, the bed shell 32 can form a continuous ring, containing multiple beds 30.

Figure 4:
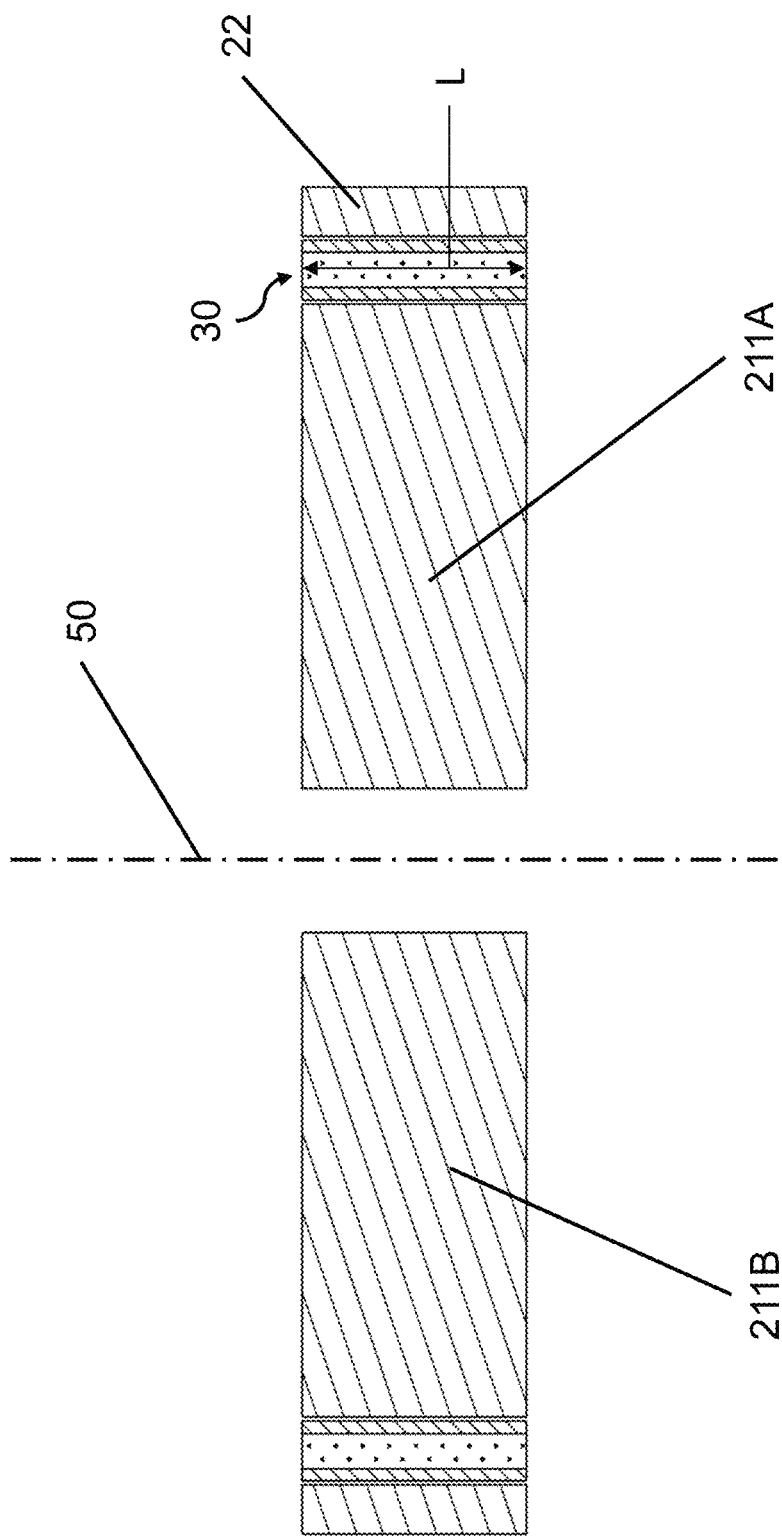
FIG. 4 is a side view of the drum-type MR apparatus shown in FIG. 3, showing half of the system at a cross-section through a symmetry plane parallel to the central axis.

In the 2D drum apparatus shown in FIG. 3, relative rotation between the magnetic-field source 20 and the beds 30 generates a time-varying magnetic field within the gap where the beds 30 are located. The magnetic field within the gap at a fixed circumferential position alternates between a high field value or state and a low field value or state. Various rotational configurations are possible, including rotating the magnetic-field source 20 with the beds 30 fixed in position or rotating the beds 30 with the magnetic-field source 20 fixed in position. FIG. 4 shows a side view of the 2D drum apparatus shown in FIG. 3, at a cross-section through a symmetry plane parallel to the central axis 50. As shown, the cross-section is taken through the high field region of the gap and includes the pole pieces 211A and 211B, the beds 30 and the OFR 22. The axial length of the gap in this embodiment, L (FIG. 4), is equivalent to the axial length of the beds 30. Correspondingly, the axial length of the side magnets 212 is equal to the axial length of the gap, L. Hence, the mass of magnetic material in the 2D drum apparatus is proportional to L.

Figure 5:
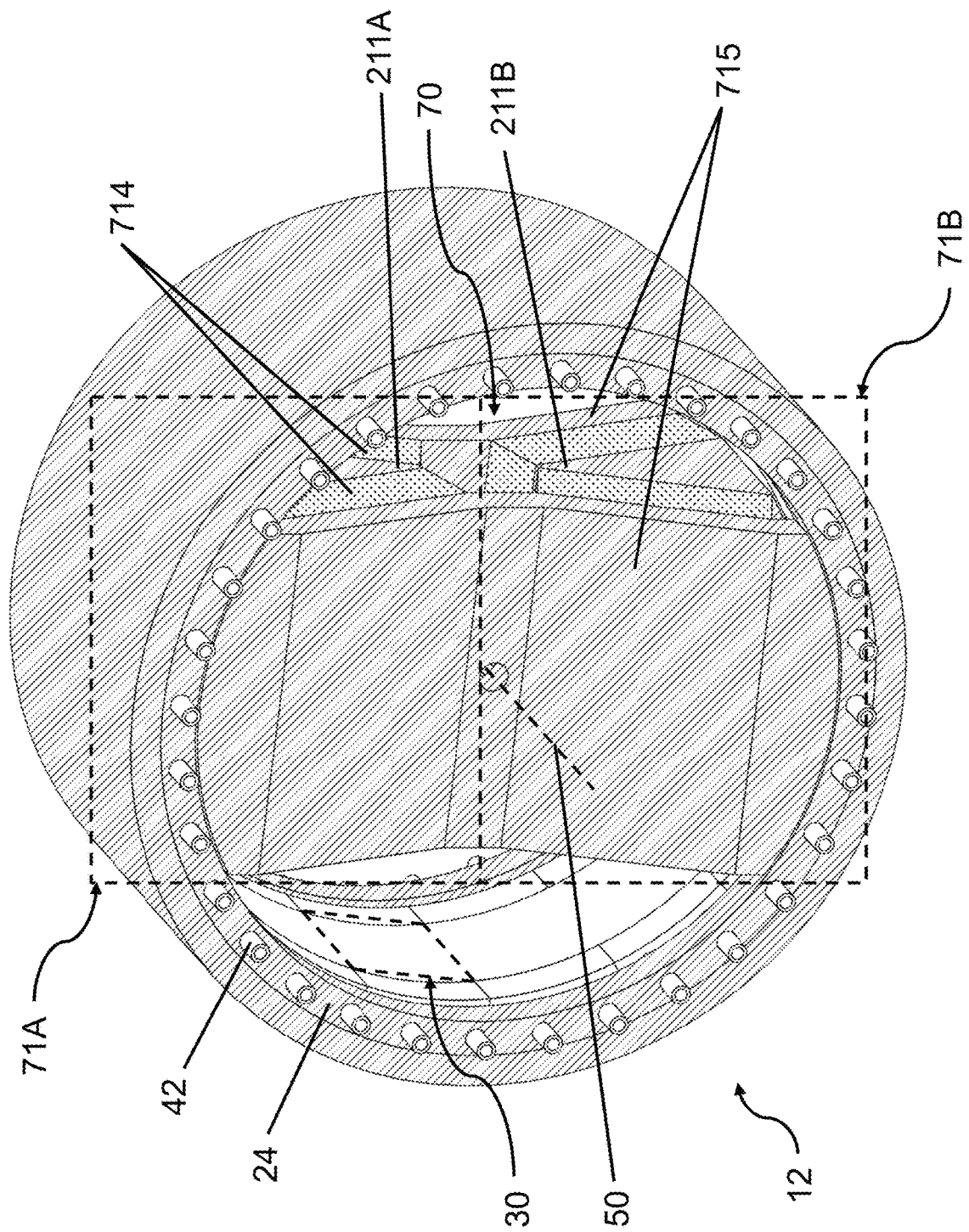
FIG. 5 is an isometric view of an MR apparatus that includes a pole piece tapered on its axial-end surfaces, in accordance with an illustrative embodiment.
Figure 6:
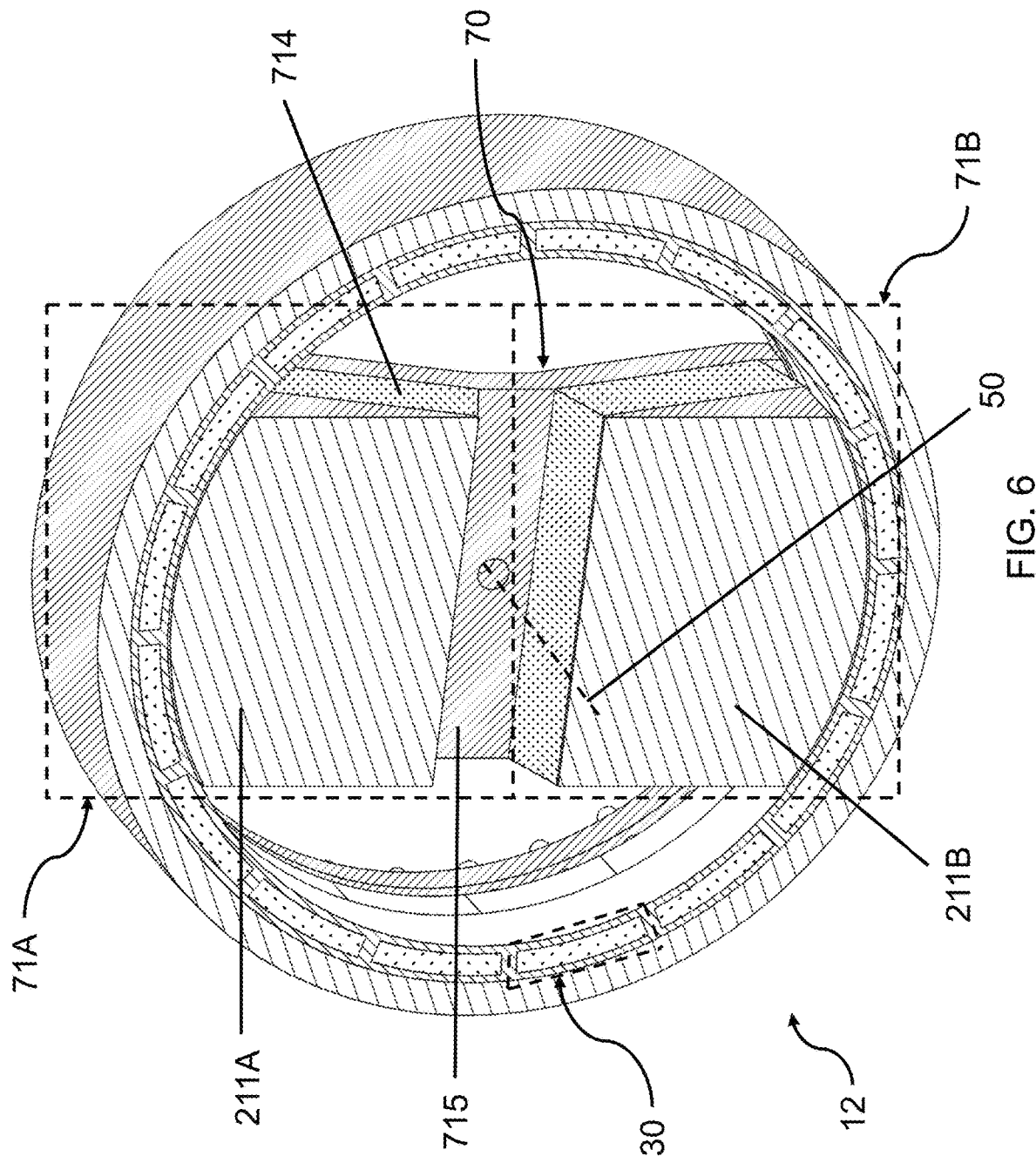
FIG. 6 is an isometric view of the MR apparatus shown in FIG. 5 at a cross-section through a symmetry plane perpendicular to the central axis, in accordance with an illustrative embodiment.

FIGS. 5 and 6 show isometric views of an illustrative embodiment of the MR apparatus 12 according to the present disclosure, referred to herein as the axial embodiment. FIG. 6 is a cross-sectional view of the MR apparatus 12 of FIG. 5. The MR apparatus 12 comprises at least two magnetocaloric beds 30, a magnetic-field source 70, a heat transfer fluid, one or more HHEXs (not pictured), and one or more pumps or fluid displacement devices (not pictured) configured to move the heat transfer fluid through the MR apparatus 12. The axial embodiment further comprises one or more valves (not pictured) configured to control the flow of heat transfer fluid to the beds 30 and one or more CHEXs (not pictured) that accept cold fluid from the demagnetized beds 30. As shown in FIGS. 5 and 6, the beds 30 are arranged in a circumferential direction relative to the central axis 50 and are coaxial with the magnetic-field source 70, such that the magnetic-field source 70 is substantially surrounded by the beds 30 in a plane that is normal to the central axis 50. In some embodiments, the magnetic-field source 70 is entirely surrounded by the beds 30. Unlike the 2D drum apparatus, the axial embodiment (FIGS. 5 and 6) utilizes a magnetic-field source 70 with a magnetic pole piece subassembly (MPS) having axial-end magnets 714 and axial-end flux return pieces 715, whose cross-sections along planes normal to the central axis 50 are non-identical. In other words, at least one of the following parameters at a given cross-section normal to the central axis 50 depends on the axial position of the cross-section: 1) the number of each type of the magnetic circuit components in each pole 71A, 71B, 2) the shape of at least one type of the magnetic circuit components in each pole 71A, 71B, and 3) the cross-sectional area of at least one type of the magnetic circuit components in each pole 71A, 71B. The magnetic circuit components for each pole 71A, 71B of the magnetic-field source 70 generally include the one or more pole pieces 211A and 211B, the magnets, and flux return pieces; for example, the components of the magnetic circuit for the axial embodiment include the pole pieces 211A and 211B, axial-end magnets 714 (generally referred to as a flux generating component), as well as the axial-end flux return pieces 715 (generally referred to as flux transmitting components). Importantly, the length of at least one type of the magnetic circuit components (comprising the magnetic-field source for the axial embodiment) parallel to the central axis 50 is less than the entire length of the magnetic-field source 70 in a direction parallel to the central axis 50. The entire length of the magnetic-field source 70 is equal to the largest distance between surfaces of the magnetic circuit components at each axial end of the magnetic-field source 70 (in a direction parallel to the central axis 50). The axial-end magnets 714 are located at each axial end of the pole pieces 211A and 211B in each pole 71A and 71B. The axial-end magnets 714 are arranged to contact the surfaces at each axial end of the pole pieces 211A and 211B. These contact surfaces, normal to the central axis 50 at each axial end of the pole piece 221A and 221B, are referred to herein as the axial-end surfaces. The axial-end flux return pieces 715 are arranged to contact the axial-end magnets 714 at each axial end of the MR apparatus 12. The axial-end flux return pieces 715 function to complete the magnetic circuit for the axial-end magnets 714.

FIG. 7A shows a cross-sectional view of the axial embodiment, at a cross-section through a symmetry plane parallel to the central axis 50. As shown in FIG. 7A, the axial-end surfaces of pole pieces 211A and 211B are tapered such that the distance between axial-end magnets 714 near the outer radius of the pole pieces 211A and 211B is greater than the distance between the axial-end magnets 714 near the inner radius of the pole pieces 211A and 211B. In the axial embodiment, the axial-end magnets 714 are separated from one another at the outer radius of the pole pieces 211A and 211B by an axial distance that is generally equal to the axial gap length, L. As L decreases, the mass of magnetic material also decreases. However, unlike the 2D drum apparatus, the decrease in the mass of magnetic material is not directly proportional to L. This beneficial relationship, between magnet mass and L for the axial embodiment, increases the maximum flux density that can be achieved in the gap.

Various shapes are contemplated for the axial-end magnets 714; for example, the axial-end magnets 714 can take the form of right prisms with trapezoidal base or axial-end faces or any other suitable shape. In the axial embodiment, the axial-end magnets 714 take the form of rectangular prisms that are tilted. As shown in FIG. 7A, cross-sections of the magnetic-field source 70, normal to the central axis 50, are non-identical (or non-similar). Using magnets in the form of rectangular prisms typically reduces manufacturing costs. As shown by the dotted arrows in FIG. 7A, the magnetization vector for the axial-end magnets 714 is oriented toward pole piece 211A in pole 71A and away from pole piece 211B in pole 71B. The size of the axial-end magnets 714 has an impact on the mass efficiency of the permanent magnet material. For the axial embodiment shown in FIG. 7A, the length of the axial-end magnets 714 in a substantially radial direction, $R_e$, is at least three times greater than the thickness of the magnets, in a direction parallel to the direction of magnetization, $T_e$. The result of this constraint is that the energy product within the magnets is closer to the optimal value, which increases the mass efficiency of the permanent magnet material.

In the axial embodiment, as shown in FIG. 7A, the MR apparatus 12 further comprises an OFR 22 and gap flux return pieces 24. Both the OFR 22 and the gap flux return pieces 24 are made from a soft magnetic material. The gap flux return pieces 24 are located at each axial end of the gap and provide an alternate path for magnetic flux between the OFR 22 and the axial-end magnets 714. As shown in FIG.

7A, the magnetic flux is directed from end magnets 714 in pole 71A through the pole piece 211A and then in a substantially radial direction through the gap to the OFR 22. The magnetic flux can then pass through one of two parallel magnetic circuits. As with the 2D drum apparatus, the magnetic flux can pass through the OFR 22 circumferentially before returning in a substantially radial direction through the gap to the pole piece 211B. Alternatively, the flux can pass axially through the OFR 22, then through the gap flux return pieces 24, before returning through the axial-end flux return pieces 715 to the axial-end magnets 714. Incorporating the gap flux return pieces 24 increases the magnetic flux density in the high field region without changing the mass of permanent magnet material in the magnetic-field source 70, thereby increasing the mass efficiency of the permanent magnet material in the MR apparatus 12.

The gap flux return pieces 24, shown in FIG. 5 and FIG. 7A, can be integrated with the OFR 22 or split into separate pieces of material. A means for transporting fluid between the beds 30 and other components in the MR apparatus 12 is provided in the axial embodiment in the form of flow tubes 42 that extend from the fluid plena 40 and pass through the gap flux return pieces 24. These flow tubes 42 are generally made from a lightweight material with low thermal conductivity; some examples include polycarbonate and polypropylene whose density and thermal conductivity are on the order of 1.2 g/cm$^3$ and 0.2 W/m-K, respectively, although other suitable materials may also be used. In the axial embodiment, through-hole passageways are machined into the one or more gap flux return pieces 24 (or otherwise produced) to accommodate the flow tubes 42 as shown in FIG. 5. Various shapes/slots may be used to accommodate the flow tubes 42; for example, circular holes may be drilled into the one or more gap flux return pieces 24 to provide additional structural support for the flow tubes 42 (FIG. 5). Alternatively, the through-hole passageways may comprise slots with parallel surfaces cut into the one or more gap flux return pieces 24 from the inner radius; a surface of the slot (at the outer radius of the slot) may optionally be curved to provide uniform clearance between the flow tubes 42 and the one or more gap flux return pieces 24. Ideally the passageways will be small, though larger passageways can also be accommodated given an appropriate increase in the axial thickness of the gap flux return pieces 24. As shown in FIG. 7A, the gap flux return pieces 24 are fixed in position relative to the beds 30. The axial thickness of the gap flux return pieces 24 is generally equal to the thickness of the axial-end flux return pieces 715 at the inner radius of the gap to accommodate the transfer of magnetic flux throughout the cross section.

FIG. 7B shows a detail view of a portion of the pole piece 211B that is near the central axis 50. The angle formed between the pair of axial-end magnets 714 in the pole piece 211B is represented as $\theta_e$ in this embodiment. This angle, $\theta_e$, will be referred to herein as the axial-face angle. As shown in FIG. 7A, the same axial-face angle is generally used between poles 71A and 71B. The pole pieces 211A and 211B are tapered to increase the axial-face angle, $\theta_e$, between the axial-end magnets 714, which increases the mass efficiency of the permanent magnet material in the magnetic-field source 70.

As shown in and FIG. 7B, the axial-end magnets 714 are not in direct contact with one another. Instead, the edges of the adjacent axial-end magnets 714 near the rotational axis 50 are separated by a distance x. For tapered pole piece arrangements, the distance, x, is generally much smaller than the thickness of the magnets parallel to the direction of magnetization, $T_e$ (FIG. 7A); for example, x can be less than 10% of $T_e$, although other distances may be suitable. Using a small value of x reduces magnetic field leakage toward the inner diameter of the magnetic-field source 70. However, in the limit where the edges of the adjacent magnets are in contact, the pole pieces 211A and 211B will saturate so that no further magnetization of the pole pieces 211A and 211B can occur in the inner corner, thereby reducing the mass efficiency of the permanent magnet material in the magnetic-field source 70. Small values of x will also cause the energy product of the axial-end magnets 714 to shift in the corner region nearest the adjacent magnet (due to the change in field intensity and flux density in this region), which leads to further reductions in mass efficiency.

Various arrangements of axial-end magnets 714 in the MR apparatus 12 are contemplated. The arrangement of the magnets in the axial embodiment is shown in more detail in FIG. 7C, which shows only the axial-end magnets 714 and the pole pieces 211A and 211B. Some additional examples of possible magnet arrangements are shown in the embodiments of FIG. 8A through FIG. 8C. In each of the FIGS. 8A through 8D, the arrangement of the magnets is illustrated using an isometric view of the MPS, which includes only the axial-end magnets 714 and the pole pieces 211A and 211B. FIG. 8A depicts a magnet arrangement that is similar to the axial embodiment, but with a different magnet geometry. The axial-end magnets 714 in the embodiment of FIG. 8A are in the shape of right prisms whose base faces are in the shape of trapezoids such that they taper away from the beds 30 in the low field region of the MR apparatus 12. By tapering the magnets away from the beds 30, the average magnetic flux density in the low field region is reduced which increases the performance of the MR system. In FIG. 8A, both the cross-sectional area and shape of the axial-end magnets 714 and pole piece 211A, 211B vary along planes that are normal to the central axis 50 (planes that pass through the MPS). In the embodiment in FIG. 8B, the axial-end magnets 714 are parallel to one another and perpendicular to the central axis 50. As shown in FIG. 8B, the geometry of the MPS in cross-sections normal to the central axis 50 is the same all along the axial length of the MPS; however, the magnetic circuit components shown in various cross-sections normal to the central axis 50 are functionally distinct. In other words, the number of each type of the magnetic circuit components at a cross-section through the magnetic-field source at a given axial position (for example, through the center of the axial-end magnets 714) is different from the number of each type of the magnetic circuit components at a cross-section through the magnetic-field source at a different axial position (for example, through the pole piece 211A or 211B). Hence the MPS in FIG. 8B may still be characterized as having non-identical (or non-similar) cross-sections normal to the central axis 50. Alternatively, the axial-end magnets 714 can take the form of right prisms whose base faces are in the shape of trapezoids, as shown in FIG. 8C, to reduce the magnetic flux density in the low field region. It is further contemplated that the number of magnets in each pole 71 of the magnetic-field source 70 can also vary. For example, in the embodiment shown in FIG. 8B, the magnetic flux density in the gap could be increased by adding one or more side magnets 212 in contact with the exposed, non-gap-facing surface of each pole piece 211A and 211B near the inner diameter of the magnetic-field source 70. An example of an embodiment with an additional side magnet 212 in contact with the exposed surface at the inner radius of the pole piece 211A and 211B is shown in FIG. 8D. The addition of side magnets 212 also increases the axial-face angle, $\theta_e$, between adjacent magnets. Increasing the axial-face angle, $\theta_e$, between adjacent magnets including magnets that share a common edge increases the mass efficiency of the permanent magnet material. Additional side magnets 212 could also be added to any of the other configurations to increase the axial-face angle, $\theta_e$, between adjacent magnets or magnets that share a common edge, thereby increasing the mass efficiency of the permanent magnet material.

Figure 9:
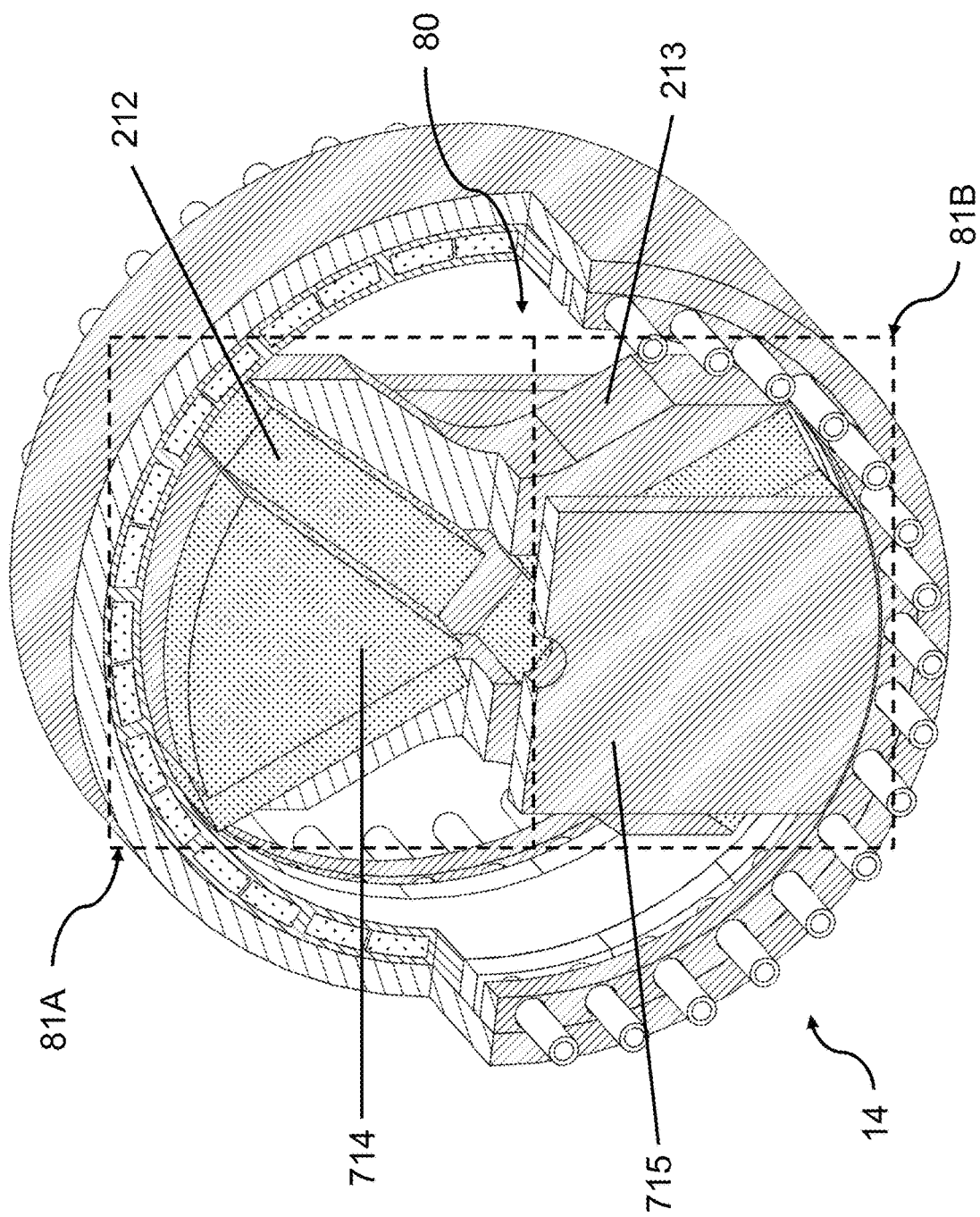
FIG. 9 is an isometric view of an MR apparatus including axial-end magnets and side magnets, in accordance with an illustrative embodiment.
Figure 10:
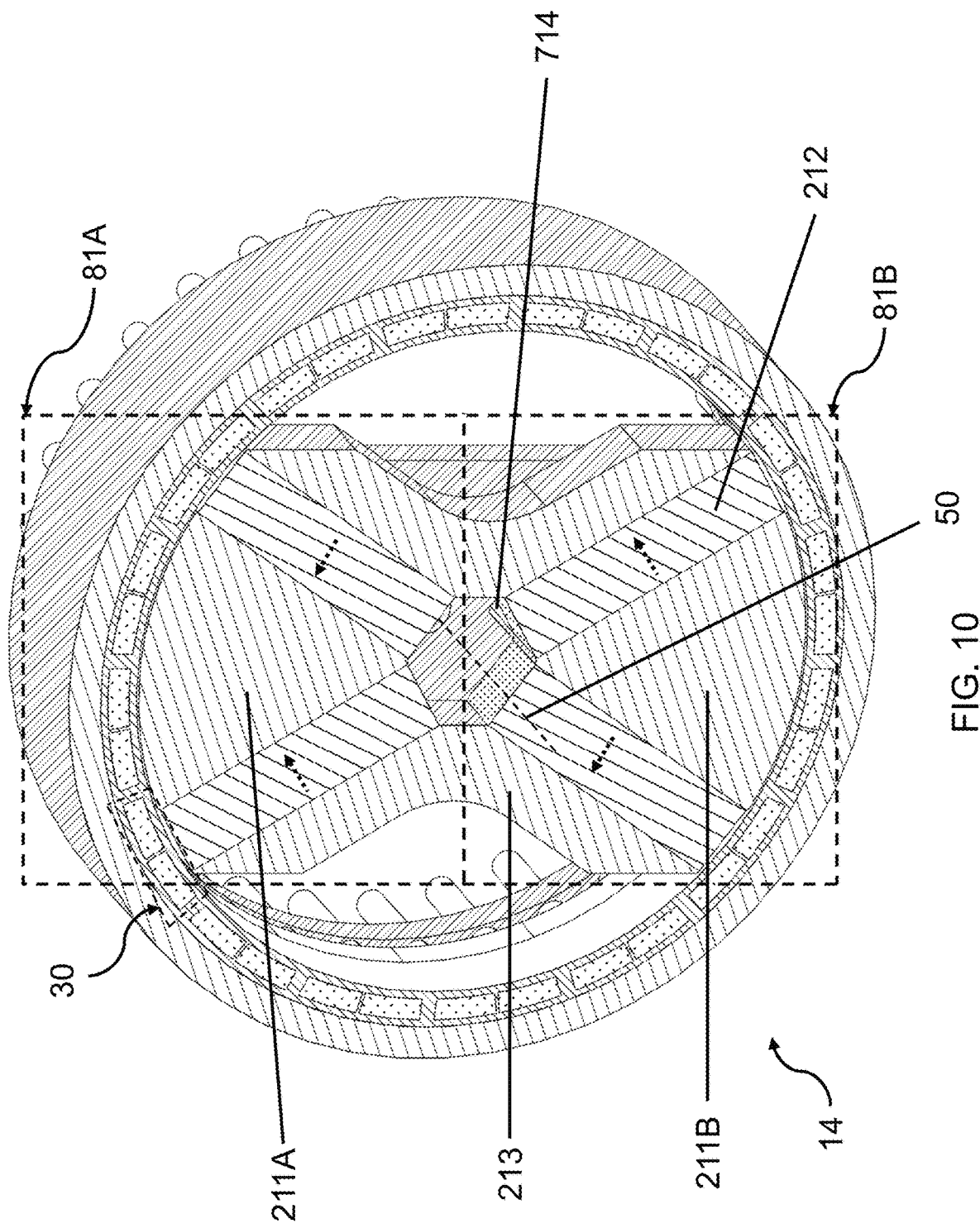
FIG. 10 is an isometric view of the MR apparatus shown in FIG. 9 at a cross-section through a symmetry plane perpendicular to the central axis, in accordance with an illustrative embodiment.
Figure 11A:
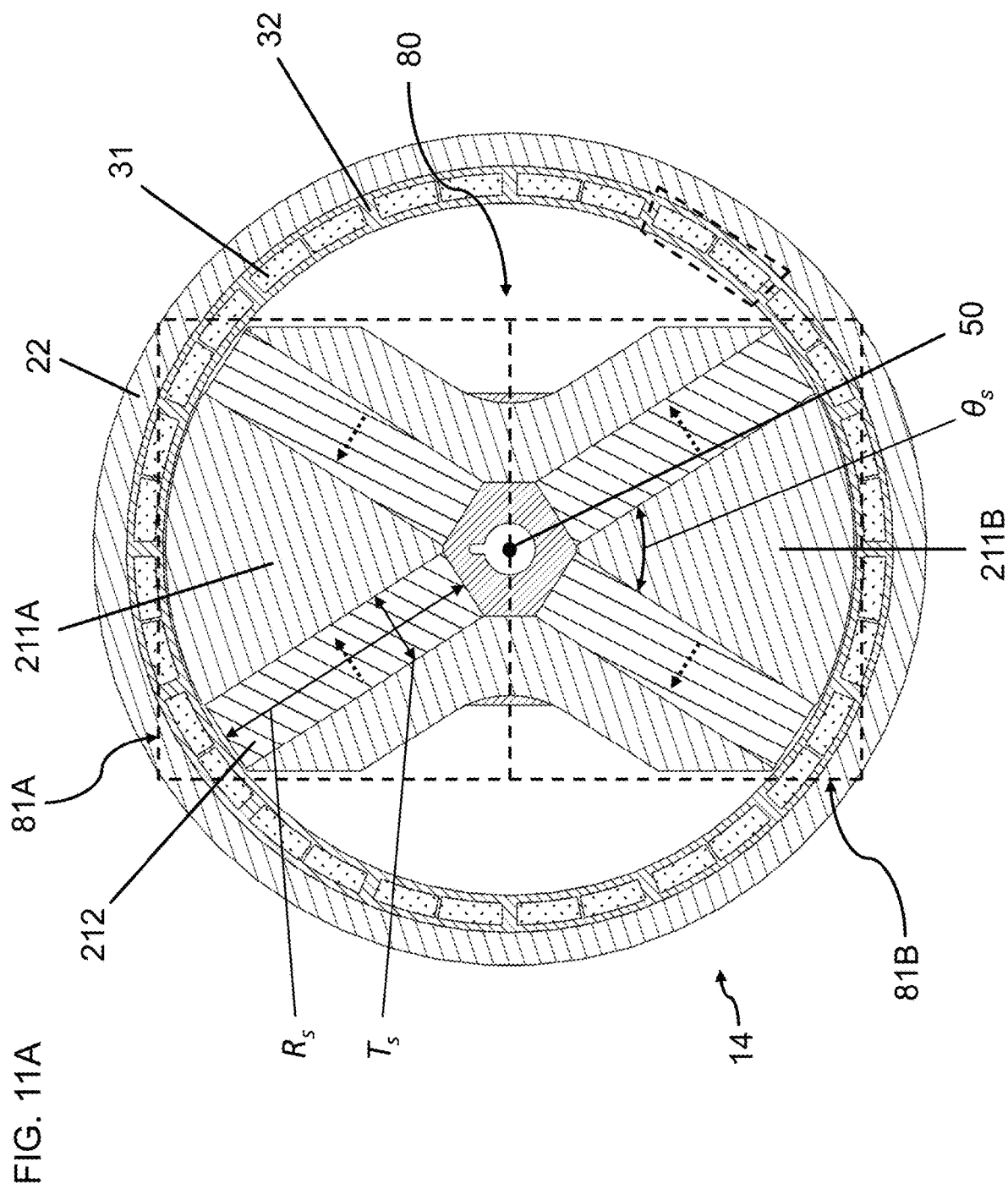
FIG. 11A is an end view of the cross-section of the MR apparatus of FIG. 10, in accordance with an illustrative embodiment.
Figure 11B:
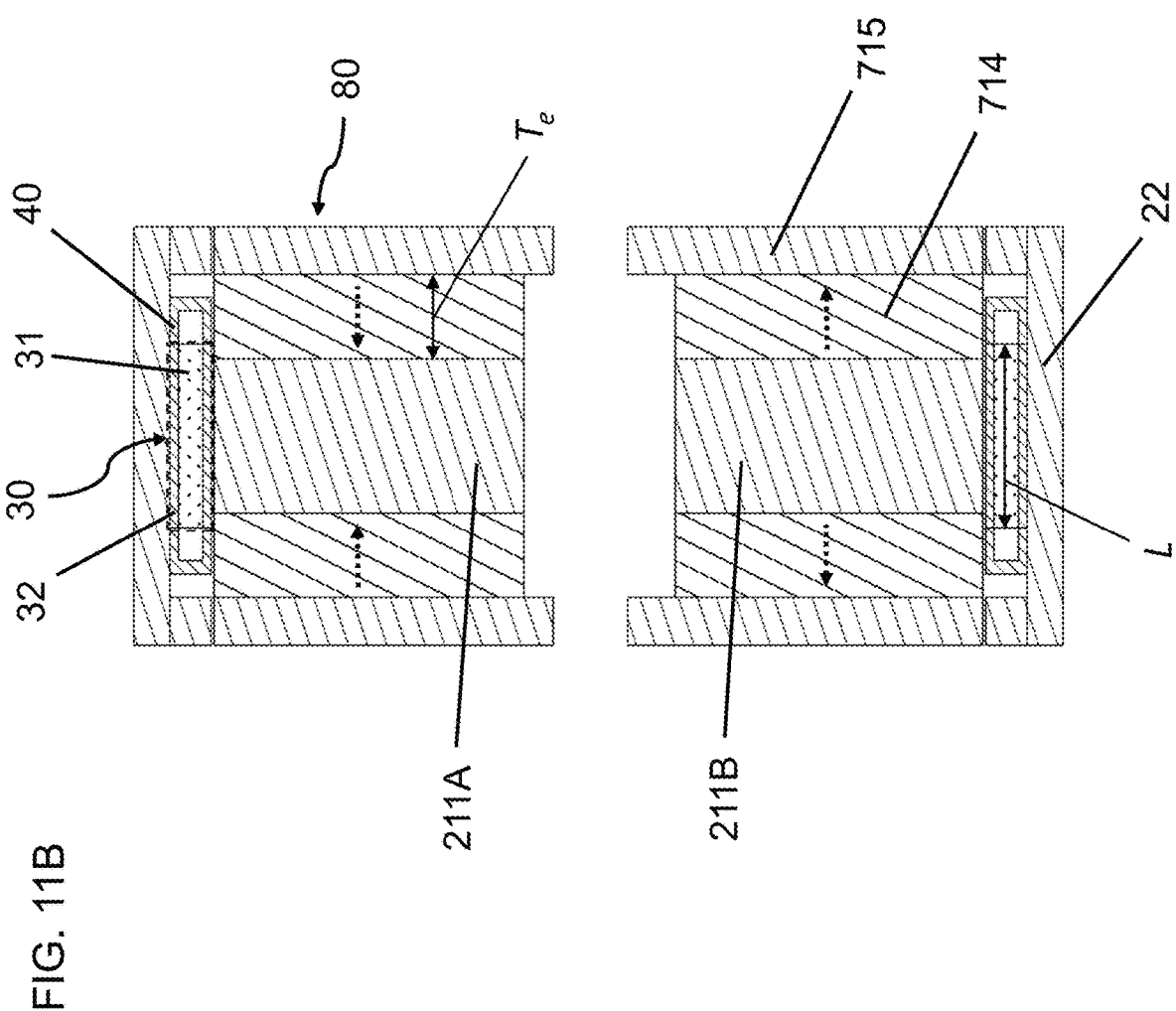
FIG. 11B is a side view of the MR apparatus shown in FIG. 10, at a cross-section through a symmetry plane parallel to the central axis, in accordance with an illustrative embodiment.
Figure 11C:
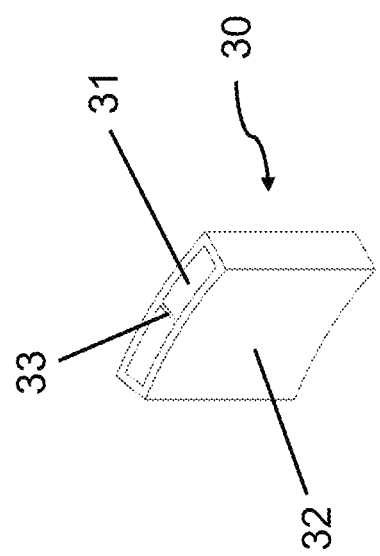
FIG. 11C is an isometric view of a single magnetocaloric bed isolated from the MR apparatus shown in FIG. 10, in accordance with an illustrative embodiment.

In another illustrative embodiment, shown in FIG. 9 and referred to herein as the full array embodiment, the MR apparatus 14 utilizes a magnetic-field source 80 comprised of poles 81A and 81B with MPS having both axial-end magnets 714 and axial-end flux return pieces 715 as well as side magnets 212 and side flux return pieces 213. As with the axial embodiment, the cross-sectional geometry of the magnetic-field source 80 for the full array embodiment varies along planes normal to the central axis 50. The magnetic circuit components for the magnetic-field source in the full array embodiment include the pole pieces 211A and 211B, axial-end magnets 714, side magnets 212 (both generally referred to as flux generating components), the side flux return pieces 213 and axial-end flux return pieces 715 (generally referred to as flux transmitting components). As shown in FIG. 9, the length of the magnetic circuit components parallel to the central axis 50 is less than the entire length of the magnetic-field source 80 in a direction parallel to the central axis 50. As shown in FIG. 10, the side magnets 212 for the full array embodiment are arranged in a circumferential direction to at least partly surround the pole pieces 211A and 211B. The side magnets 212 are arranged to contact the side surfaces of the pole pieces 211A and 211B in each pole 81A and 81B. In the full array embodiment, the side flux return pieces 213 are concave, such that they contour away from the beds 30, thereby reducing the magnetic flux density in a region of the gap between poles 81A and 81B. A large difference between the average flux density in the high field region and the low field region improves the performance of the MR system. Using a combination of the side magnets 212 and axial-end magnets 714 increases the magnetic flux density in the high field region of the gap. Additionally, the axial-end magnets 714 reduce the flux leakage that occurs at either axial end of the magnetic-field source 80 as compared with configurations utilizing the side magnets 212 only (e.g. the 2D drum apparatus). Both of these factors increase the mass efficiency of the magnetic-field source 80 (FIG. 9). The shape of the side magnets 212 is shown in FIG. 10 and FIG. 11A at a cross-section through a symmetry plane perpendicular to the central axis 50. The shape of the axial-end magnets 714 and axial-end flux return pieces 715 is shown in FIG. 11B. A partial view of a single bed 30 for the full array embodiment is shown in FIG. 11C. Returning to FIG. 11A, in the full array embodiment the side magnets 212 are in the shape of rectangular prisms. The side surfaces of the pole pieces 211A and 211B, in contact with the side magnets 212, are tapered to increase the side-face angle, $\theta_s$, between adjacent side magnets 212. A side-face angle between side magnets, $\theta_s$ that is greater than or equal to 40° is typically used to maintain a high mass efficiency for the permanent magnet material. The side-face angle between side magnets, $\theta_s$, is preferably even larger; for example, the side-face angle, $\theta_s$, may be greater than or equal to 45°, 50°, 55°, or 60°, regardless of the number of poles 81A and 81B in the magnetic-field source 80. The axial-end magnets 714 are in the shape of right prisms with a cross-sectional geometry (FIG. 12A), perpendicular to the central axis 50, that is generally similar to the pole pieces 211A and 211B. The base faces of the pole pieces 211A and 211B, at each axial end of the magnetic-field source 80, have a curved edge nearest the gap to maintain uniform clearance with the beds 30. As shown in FIG. 11B, the axial-end magnets 714 are arranged parallel to one another and arranged to contact the axial-end surfaces of the pole pieces 211A and 211B.

Other magnet shapes and arrangements in addition to that shown for the full array embodiment are also contemplated. Some examples are shown in the embodiments of FIG. 12A through 12D. In each of the FIGS. 12A through 12D, the arrangement of the magnets is illustrated using an isometric view of the MPS, which includes axial-end magnets 714, side magnets 212, and the pole pieces 211A and 211B. FIG. 12A depicts the magnet configuration for the full array embodiment. FIG. 12B depicts a magnet arrangement where both the side magnets 212 and the axial-end magnets 714 are tapered to increase the mass efficiency of the permanent magnet material in the magnetic-field source 80. In this embodiment, both the side magnets 212 and the axial-end magnets 714 are in the shape of right prisms whose base faces are in the shape of trapezoids. In FIG. 12C, the axial-end magnets 714 are in the shape of rectangular prisms and the side magnets 212 are tapered. In FIG. 12D, the pole piece is not tapered and both the side magnets 212 and the axial-end magnets 714 are in the shape of rectangular prisms, which are typically less expensive to manufacture. It is further contemplated that the number of magnets 212 and 714 used in each pole 81A and 81B (FIG. 10) of the magnetic-field source 80 can also vary. For example, in the embodiment shown in FIG. 12D, the magnetic flux density in the gap could be increased by adding one or more side magnets 212 in contact with the exposed, non-gap-facing surface of each pole piece 211A and 211B near the inner diameter of the magnetic-field source 80. In the embodiment shown in FIG. 12E, all of the non-gap-facing surfaces of each pole piece 211A and 211B are covered by either axial-end magnets or side magnets. An example of an embodiment with a side magnet 212 in contact with the exposed surface at the inner radius of the pole piece 211A and 211B is shown in FIG. 12E. Furthermore, side magnets 212 could also be added to any of the other configurations to increase the axial-face or side-face angle, $\theta_e$ or $\theta_s$, respectively, formed between adjacent magnets and increase the mass efficiency of the permanent magnet material.

The size of the magnets also has an impact on the mass efficiency of the permanent magnet material in the magnetic-field source 80. In the full array embodiment, shown in FIGS. 11A and 11B, the thickness of the axial-end magnets 714 and side magnets 212, in a direction that is parallel to the direction of magnetization (shown by the dotted arrows in FIGS. 11A and 11B), is referenced as $T_e$ and $T_s$, respectively. The length of the side magnets 212, generally oriented in a radial direction, is referenced as $R_s$. In the full array embodiment, the dimensions of the magnets, thickness $T_s$, thickness $T_e$, and length $R_s$, are generally constrained to achieve the largest possible energy product within the magnetic material. For the full array embodiment as well as alternate embodiments, this is achieved by 1) fixing the length $R_s$ of the side magnets 212 to a value between 2 and 6 times greater than the thickness $T_e$ of the axial-end magnets 714, and 2) fixing the length, $R_s$, of the side magnets 212 to a value between 2 and 6 times greater than the thickness, $T_s$, of the side magnets 212; an improvement in the mass efficiency of the permanent magnet material may be realized for the full array embodiment by further constraining the length $R_s$ within a range of 3 and 5 times greater than the thickness, $T_s$ and $T_e$, of the side magnets 212 and axial-end magnets 714, respectively, with the range preferably between 3.5 and 4. Note that this means the thicknesses, $T_s$ and $T_e$, of the side magnets 212 and axial-end magnets 714, respectively, should be approximately equal. The result of these two constraints is that the energy product within the magnets is closer to the optimal value, which increases the mass efficiency of the permanent magnet material in the magnetic-field-source 80. The optimal ratio of length over thickness varies for different configurations.

FIG. 11C generally depicts a single magnetocaloric bed 30 comprising MCM 31 and a bed shell 32. It is contemplated that the axial length of the beds 30 in the gap, axial length L in FIG. 11B, is generally equal to the axial length of the pole pieces 211A and 211B. However, alternative configurations are also considered. In the high flux embodiment shown in FIG. 11B, the axial length, L, of the gap is slightly larger than the axial length of the pole piece 211A and 211B; more specifically, the axial length, L, of the gap for the full array embodiment is 16% larger than the axial length of the pole piece 211A and 211B although other differences in length are possible. In this embodiment, the flux density in the high field region drops off drastically at each axial end of the pole piece 211A and 211B. Arranging the beds 30 to utilize a portion of the annular gap just beyond each axial end of the pole pieces 211A and 211B provides an advantage with respect to magnet mass efficiency, since the beds 30 utilize some of the fringe field or leakage field region of the gap. Conversely, increasing the axial length of the pole pieces 211A and 211B, and thus the axial distance between the axial-end magnets 714, to have a greater separation than L improves magnetic flux uniformity throughout the beds 30. Improving the magnetic flux uniformity throughout the beds 30 improves the performance of the MR system.

The bed shell 32, as shown in FIG. 11C, is typically made from a lightweight material with low thermal conductivity; some examples include polycarbonate and polypropylene whose density and thermal conductivity are on the order of 1.2 g/cm$^3$ and 0.2 W/m-K, respectively, although other suitable materials may also be used. As shown in FIG. 11A, the bed shell 32 occupies a portion of the high field region of the gap and contains the heat transfer fluid as it passes through the beds 30. It is beneficial to use the smallest wall thicknesses possible for the bed shell 32 so that the MCM 31 can utilize a larger proportion of the high field region. However, the radial thickness of the bed shell wall should be large enough to limit deflection resulting from the fluid pressure drop within the beds 30. It is advantageously contemplated that small supporting features can be incorporated into the bed shell 32 to provide additional support against radial deflection. An example of a small support feature is shown for a single magnetocaloric bed 30 in FIG. 11C. In this embodiment, a thin supporting wall 33 is used to reduce the longest unsupported span of the bed shell 32 and provide support against radial deflection. As shown in FIG. 11C, the thickness of the thin supporting walls 33 are equal to or less than the thickness of other walls in the bed shell; for example, the thickness of the supporting wall may be 50% less than the thickness of other walls in the bed shell, although other suitable values may be used. The volume of the gap occupied by the thin wall 33 in this embodiment is less than the additional volume required for a sufficiently thick outside bed shell wall without a supporting feature. Other configurations are also contemplated, including thin walls that extend through only a fraction of the beds length and supporting pins located at key locations along the bed shell 32.

Figure 13:
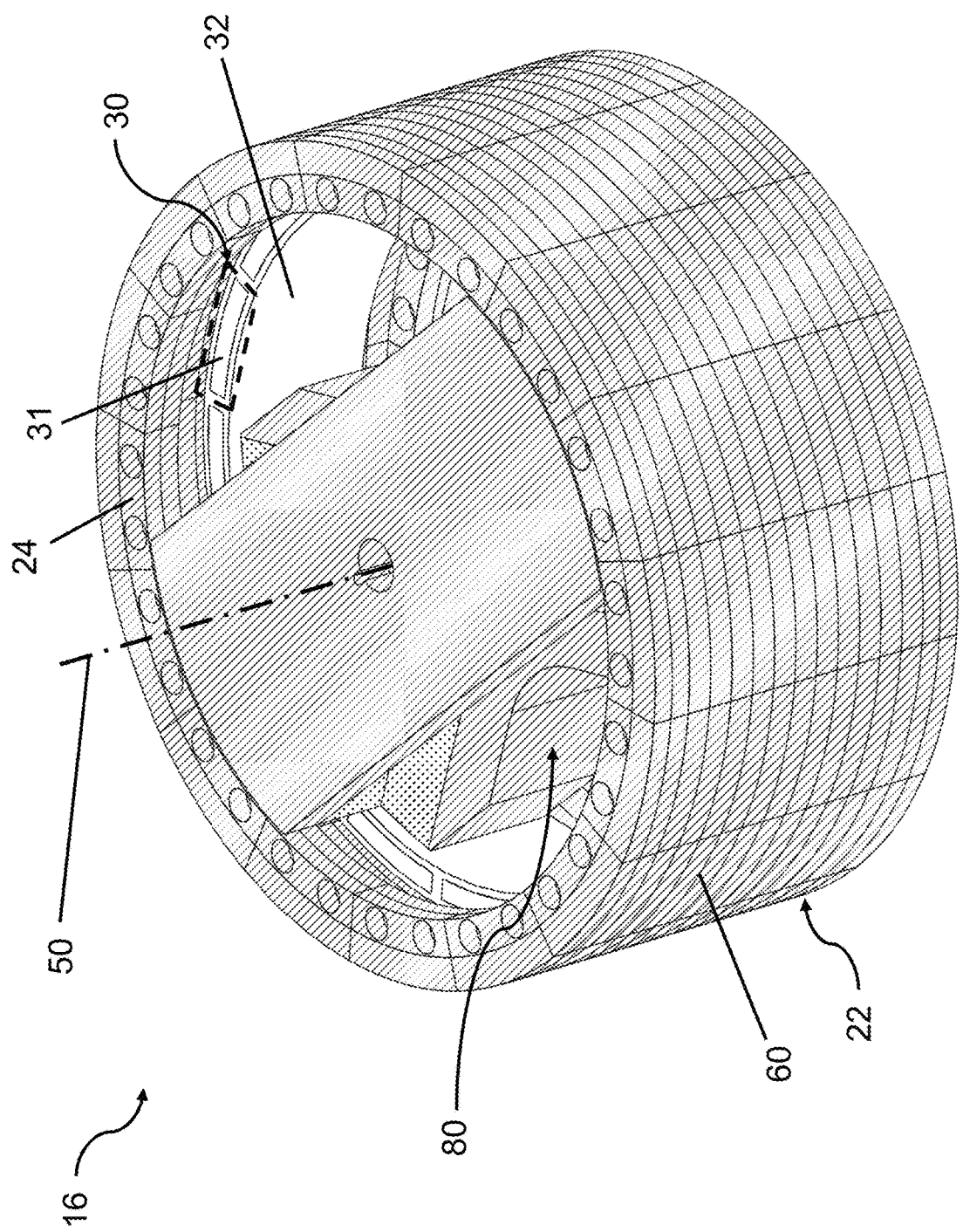
FIG. 13 is an isometric view of an embodiment of a MR apparatus of the present disclosure that includes a laminated circumferential flux return.

As shown in FIG. 11A, the OFR 22 for the full array embodiment is made from a single piece of soft magnetic material. The OFR 22 is typically cylindrical in form and functions to channel the magnetic flux between poles 81A and 81B of the magnetic-field source 80. Many possible arrangements of the OFR 22 in the MR apparatus 14 are contemplated. In the full array embodiment, as well as the embodiment of FIG. 13, the OFR 22 is arranged to be in contact with the outer surface of the bed shell 32. The embodiment shown in FIG. 13 will be referred to herein as the contacting embodiment. The mounting details for the beds 30 are not shown for either the full array or the contacting embodiments. It is contemplated that the beds 30 can be fastened to the cold and hot end plena 40, shown in FIG. 11B, using an variety of mechanical fastening means; examples of mechanical fasteners include bolts, screws, and clips that can be used along with an o-ring or other sealing means to prevent leakage of the heat transfer fluid. The plena 40 shown in FIG. 13 for the contacting embodiment are secured using epoxy or other adhesive product. The plena 40 are generally made from a lightweight material with low thermal conductivity; some examples include polycarbonate and polypropylene whose density and thermal conductivity are on the order of 1.2 g/cm$^3$ and 0.2 W/m-K, respectively, although other suitable materials may also be used. The plena 40 function as a fluid conduit for the heat transfer fluid between the beds 30 and the flow tubes 42. The fluid plena 40 can be secured to the OFR 22 using locating pins or other fastening means. In the full array embodiment and the contacting embodiment, the OFR 22 provides structural support to the bed shell 32 at its outer radius, reducing the required radial thickness of the bed shell 32. In the bed-OFR contacting arrangement there is also no clearance between the bed shell 32 and OFR 22. These features allow the MCM 31 to occupy a larger proportion of the high field region of the gap, which increases the mass efficiency of the permanent magnet material.

In the full array and contacting embodiments, the OFR 22 is made from a soft magnetic material and is fixed in position relative to the beds 30. Alternatively, the OFR 22 can be fixed in position relative to the magnetic-field source 80. For the contacting embodiment, the relative rotation of the magnetic-field source 80 with respect to the OFR 22 generates eddy currents within the OFR 22. The eddy currents dissipate energy in the form of heat, which can be transported to the beds 30, thereby penalizing the performance of the MR system. The generation of eddy currents requires energy input from the drive system, which also reduces the performance of the MR system. Among the many alternatives to reduce eddy current heating, the OFR 22 can be laminated by gluing together stacks of soft magnetic material, with the glue bond lines serving as electrical insulation between adjacent layers in the stack. An example of these laminations 60 is shown in the contacting embodiment of FIG. 13. Note that in the contacting embodiment, the gap flux return pieces 24 are also laminated to reduce eddy current heating. The laminations 60 are generally oriented perpendicular to induced currents in the OFR 22 to increase electrical resistivity in the direction of current flow and reduce the size of the conductive loops available for eddy current loops to form.

An additional benefit of the laminations 60 is that they reduce the axial thermal conductivity of the OFR 22, parallel to the central axis 50, thereby reducing heat transfer losses between the hot and cold ends of the beds 30. Note that the thermal contact resistance between the beds 30 and the OFR 22 is a function of the surface finish of the mating surfaces and contact pressure. Although the laminations 60 in the OFR 22 can sufficiently reduce axial conduction in some embodiments, additional mitigation strategies are also contemplated. For example, surface features can be machined or embossed or otherwise introduced into the contacting surfaces of the OFR 22 or bed shell 32 to increase thermal contact resistance, as illustrated in FIGS. 14A and 14B, which show side view of a single bed 30 section of the OFR from the contacting embodiment and a partial view of the interface surface between the bed 30 and the OFR 22, respectively. The laminations in the OFR are hidden in FIGS. 14A and 14B. As shown, a series of grooves is machined into the bed facing surface of the OFR 22. The grooves can extend all along this surface axially (FIG. 14C and FIG. 14D). The grooves in the OFR 22 also function to increase the thermal contact resistance between the OFR 22 and the fluid plena 40 at the cold and hot ends of the beds 30.

Specific compositions and methods of a drum-type magnetic refrigeration apparatus have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A magnetic refrigeration (MR) apparatus, comprising:
   two or more beds of magnetocaloric material (MCM) arranged along a circumferential direction about a central axis;
   a heat transfer fluid;
   one or more hot side heat exchangers (HHEXs);
   one or more pumps or fluid displacement devices configured to move the heat transfer fluid through the two or more beds and the one or more HHEXs; and
   a magnetic-field source comprising one or more poles, the magnetic-field source applying a time-varying magnetic field oriented in a substantially radial direction through the two or more beds via relative rotation of the magnetic-field source with respect to the two or more beds about the central axis,
   wherein each pole comprises magnetic circuit components including a pole piece, a first axial-end magnet, a second axial-end magnet spaced apart from the first axial-end magnet in an axial direction, and a flux return piece.

2. The MR apparatus according to claim 1, wherein a cross-sectional area of at least one of the magnetic circuit components of the magnetic-field source along a plane oriented substantially normal to the central axis is not constant along an entire length of the magnetic-field source in a direction that is substantially parallel to the central axis.

3. The MR apparatus according to claim 1, wherein a length of the first axial-end magnets is at least 3 times greater than a thickness of the first axial-end magnet.

4. The MR apparatus according to claim 1, wherein the one or more pole pieces are tapered on their axial-end surfaces or side surfaces.

5. The MR apparatus according to claim 1, wherein the one or more pole pieces are tapered on their axial-end surfaces and side surfaces.

6. The MR apparatus according to claim 1, wherein the two or more beds at least partly circumferentially surround the magnetic-field source in a plane that is normal to the central axis.

7. The MR apparatus of claim 1, wherein the magnetic field source comprises a plurality of poles, and wherein the pole piece for each of the plurality of poles is separate from the pole piece of any other one of the plurality of poles.

8. The MR apparatus according to claim 1, further comprising one or more gap flux return pieces, wherein at least one of the one or more gap flux return pieces is located near an axial end of the magnetic-field source.

9. The MR apparatus according to claim 8, further comprising one or more through-hole passageways in the one or more gap flux return pieces, wherein at least one of the one or more through-hole passageways is at least partially occupied by flow tubes.

10. The MR apparatus according to claim 1, further comprising one or more circumferential flux returns that are at least partially located at an axial position along the central axis that is aligned with an axial position of the two or more beds.

11. The MR apparatus according to claim 10, wherein the two or more beds are fixed in position relative to the one or more circumferential flux returns, and wherein the one or more circumferential flux returns contact the two or more beds.

12. The MR apparatus according to claim 11, wherein each of the two or more beds comprise a bed shell, wherein at least one of the one or more circumferential flux returns further comprise surface features or at least one of the one or more bed shells further comprise surface features, and wherein the surface features are located near the interface between at least one of the one or more circumferential flux returns and at least one of the one or more bed shells.

13. The MR apparatus according to claim 1, wherein at least one of the one or more poles of the magnetic-field source further comprises a first axial-end flux return piece disposed at a first axial end of the MR apparatus adjacent to the first axial-end magnet and a second axial-end flux return piece disposed at a second axial end of the MR apparatus adjacent to the second axial-end magnet.

14. The MR apparatus according to claim 13, wherein at least one of the one or more poles further comprises one or more side magnets and one or more side flux return pieces.

15. The MR apparatus according to claim 14, wherein a length of the one or more side magnets is between 2 and 6 times greater than a thickness of the first axial-end magnet.

16. The MR apparatus according to claim 14, wherein a length of the one or more side magnets is between 2 and 6 times greater than a thickness of the one or more side magnets.

17. The MR apparatus according to claim 14, wherein the one or more pole pieces are tapered on their axial-end surfaces or side surfaces.

18. The MR apparatus according to claim 14, wherein the one or more pole pieces are tapered on their axial-end surfaces and side surfaces.

19. The MR apparatus according to claim 14, further comprising two or more side magnets, wherein an angle formed between two of the two or more side magnets, a side-face angle, is greater than 40°.

20. A method of transferring heat by a magnetic refrigeration (MR) apparatus, the MR apparatus having two or more beds of MCM arranged along a circumferential direction about a central axis, a heat transfer fluid, one or more HHEXs, one or more pumps or fluid displacement devices configured to move the heat transfer fluid through the two or more beds and the one or more HHEXs, and a magnetic-field source comprising one or more poles, the magnetic-field source applying a time-varying magnetic field oriented in a substantially radial direction through the two or more beds via relative rotation of the magnetic-field source with respect to the two or more beds about the central axis, wherein each pole comprises: a pole piece, a first axial-end magnet, a second axial-end magnet spaced apart from the first axial-end magnet in an axial direction, and a flux return piece, said method comprising:

reorienting a majority of the magnetic flux that is oriented in a substantially axial direction at a surface of at least one of the first axial-end magnet or the second axial-end magnet so that the majority of the magnetic flux passes through at least one of the two or more beds in a substantially radial direction.

21. The method of claim 20, wherein the MR apparatus further comprises a circumferential flux return that is at least partially located at an axial position along the central axis that is aligned with an axial position of the two or more beds, and wherein the method further comprises passing a fraction of the magnetic flux intercepted by the circumferential flux return in a substantially axial direction through the circumferential flux return.

* * * * *